US010380524B1

(12) United States Patent
Raymond et al.

(10) Patent No.: US 10,380,524 B1
(45) Date of Patent: Aug. 13, 2019

(54) SYSTEM AND METHOD OF AUTOMOTIVE PRODUCTION PLANNING

(71) Applicant: JDA Software Group, Inc., Scottsdale, AZ (US)

(72) Inventors: Vincent Raymond, Montréal (CA); Marc Brisson, Boucherville (CA)

(73) Assignee: JDA Software Group, Inc., Scottsdale, AZ (US)

( * ) Notice: Subject to any disclaimer, the term of this patent is extended or adjusted under 35 U.S.C. 154(b) by 303 days.

(21) Appl. No.: 15/621,525

(22) Filed: Jun. 13, 2017

Related U.S. Application Data

(60) Provisional application No. 62/361,118, filed on Jul. 12, 2016.

(51) Int. Cl.
*G06Q 10/06* (2012.01)
*G06Q 10/08* (2012.01)
*G06Q 30/02* (2012.01)

(52) U.S. Cl.
CPC ..... *G06Q 10/06313* (2013.01); *G06Q 10/067* (2013.01); *G06Q 10/06315* (2013.01); *G06Q 10/087* (2013.01); *G06Q 30/0202* (2013.01)

(58) Field of Classification Search
CPC .... G06Q 10/00; G06Q 30/02; G06Q 30/0202; G06Q 30/087; G06Q 30/0631; G06Q 50/00; G06Q 30/00; G06F 19/00; G06F 17/30

USPC ........... 705/7.22, 7.25, 7.31, 7.37, 26.5, 28; 700/100; 711/165; 707/E17.01
See application file for complete search history.

(56) References Cited

U.S. PATENT DOCUMENTS

| | | | | |
|---|---|---|---|---|
| 5,608,621 A | * | 3/1997 | Caveney | .......... G06Q 10/06315 705/7.25 |
| 8,069,326 B2 | * | 11/2011 | Shimizu | ................ G06F 3/0605 710/20 |
| 2006/0173728 A1 | * | 8/2006 | An | .................... G06Q 10/06312 705/7.22 |
| 2008/0104350 A1 | * | 5/2008 | Shimizu | ................ G06F 3/0605 711/165 |
| 2011/0282476 A1 | * | 11/2011 | Hegemier | ............ G06Q 10/087 700/100 |
| 2015/0066592 A1 | * | 3/2015 | Ehm | .................. G06Q 30/0202 705/7.31 |

\* cited by examiner

*Primary Examiner* — Olusegun Goyea
(74) *Attorney, Agent, or Firm* — Spencer Fane LLP; Steven J. Laureanti

(57) ABSTRACT

A system and method are disclosed including a production planner that receives a sales forecast for configurations of an automobile. The demand planner also receives constraints associated with an automobile supply chain. The demand planner further models configurations and constraints as a mixed integer linear programming problem, determines a production plan for automobiles, and sends instructions to cause automated machinery to retrieve an amount of automobiles equal to a forecasted production level minus a current inventory level and to move the amount of the automobile to an inventory location of the automobile.

20 Claims, 8 Drawing Sheets

SYSTEM AND METHOD OF AUTOMOTIVE PRODUCTION PLANNING

CROSS-REFERENCE TO RELATED APPLICATIONS

The present disclosure is related to that disclosed in the U.S. Provisional Application No. 62/361,118, filed Jul. 12, 2016, entitled "System and Method of Automated Production Planning." U.S. Provisional Application No. 62/361,118 is assigned to the assignee of the present application. The subject matter disclosed in U.S. Provisional Application No. 62/361,118 is hereby incorporated by reference into the present disclosure as if fully set forth herein. The present invention hereby claims priority under 35 U.S.C. § 119(e) to U.S. Provisional Application No. 62/361,118.

TECHNICAL FIELD

The present disclosure relates generally to automotive production planning and specifically to a system and method of determining allocation of automobile configuration production in a multi-plant multi-market multi-period supply chain.

BACKGROUND

Automobiles (such as cars, trucks, and other types of motorized vehicles) are typically sold in various configurations. Each configuration can have hundreds or thousands of different options. For example, a car may be sold in different trims, such as a sport model, economy model, premium model, or the like. Each of the models may have a different type of engine, radio, upholstery, lighting, or other components. Some of the components may always be sold together in the same configuration while others may never be sold in the same configuration. The configurations of the many components of the typical automobile makes determining an automotive production plan difficult. The complexity to determine automobile production with so many configurations is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
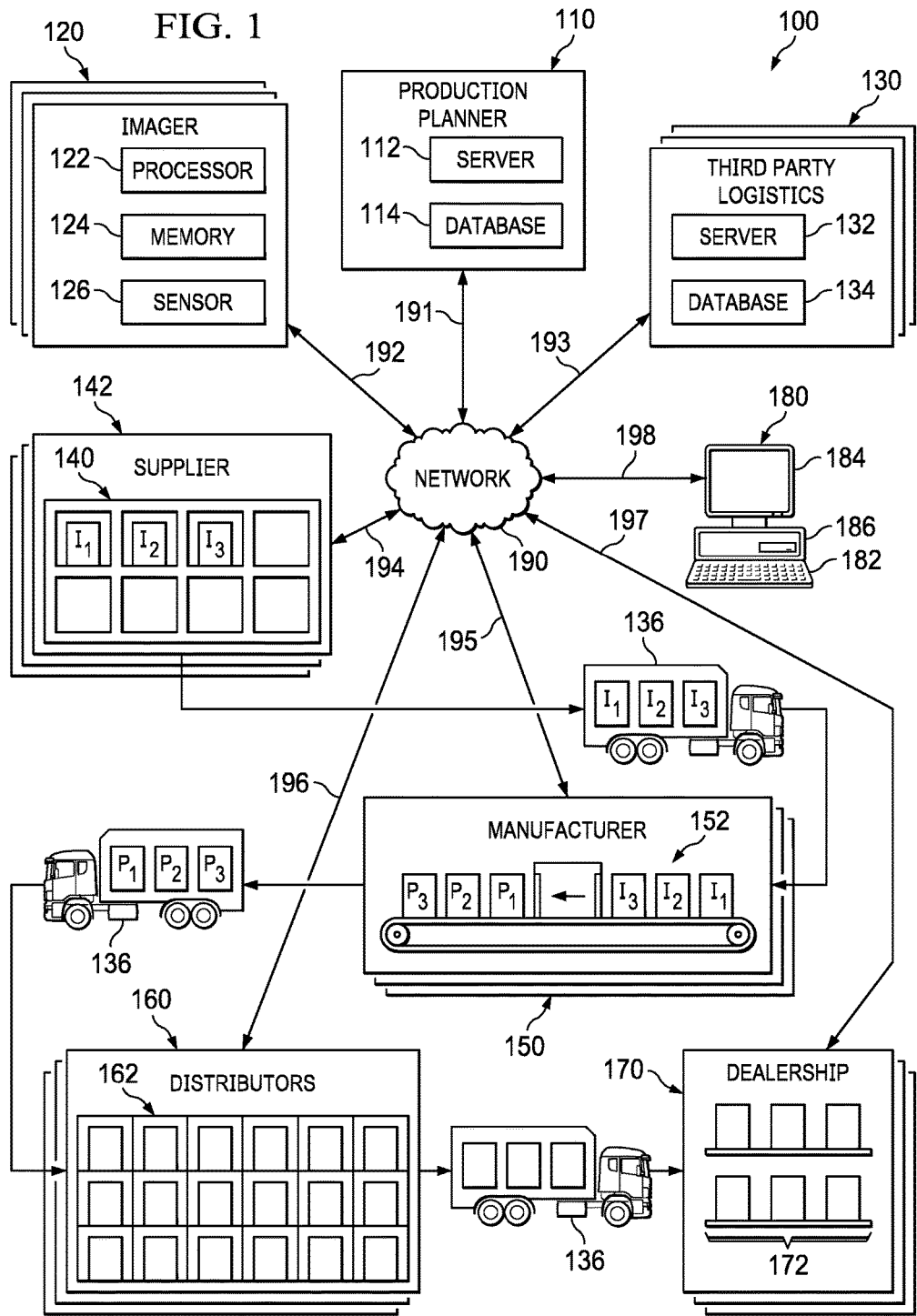
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to production planning of automobile configurations in a multi-plant multi-market multi-period automobile supply chain network. Automobiles (such as cars, trucks, and other types of motorized vehicles) are typically sold with the presence or absence of various components substituted for one another. The presence, absence, or substitution of any components may be termed as an "option." A typical automobile may comprise hundreds or thousands of options, which may be sold as various combinations of options, or configurations. For example, a particular automobile model may be sold in various types of trim, such as a sports trim, economy trim, mid-range trim, premium trim, or the like. Examples of automobile models are sports utility vehicle (SUV), station wagon, sedan, coupe, hatchback, electric, and the like. Each of the automobile models may be associated with available options such as a specific type of engine (e.g. V8, V6, four cylinder), radio (e.g. AM/FM radio, satellite radio, touchscreen interface, navigation equipment), upholstery (e.g. fabric, leather, race-style seating), lighting (e.g. fog lamps, HID lights, LED lights, projector headlights), or other like options. Some of the options may be interdependent such that some options must always be included together, some options may never be included together, and some options may or may not be included in the same configuration.

In addition, selecting automobile configurations may be dependent on more than just the interdependency of options. Selecting such a configuration may be dependent on demand, capacity and other manufacturing and logistical constraints, lead time, supply chain disruption, lot sizes, and other factors. Such factors play a crucial role in configuration decisions such as adding or removing options from a configuration or whether to introduce a new configuration.

The automobile industry has used many techniques to optimize production planning of automobile configurations including just in time, build to order, and other techniques. However, embodiments of the current disclosure solve production planning for automobile configurations from a higher-level perspective. Some embodiments employ a network model, a mixed-integer linear problem (MIP) with variable aggregation, and a well-structured MIP model for large-scale automotive production planning comprising three sub-models: a network production sub-model, an option capacity model, and a linking constraints model. According to embodiments, production plans based, at least in part, on one or more of these models may be generated from high-level inputs of automobile, manufacturing plant, market, and period information.

FIG. 1 illustrates an exemplary supply chain network 100 according to a first embodiment. Supply chain network 100 comprises production planner 110, one or more imagers 120, third party logistics 130, automobile suppliers 140, automobile manufacturers 150, automobile distributors 160, automobile dealerships 170, computer 180, network 190, and communication links 191-198. Although a single production planner 110, one or more imagers 120, one or more third party logistics 130, one or more automobile suppliers 140, one or more automobile manufacturers 150, one or more automobile distributors 160, one or more automobile dealerships 170, a single computer 180, and a single network 190 are shown and described, embodiments contemplate any number of production planners, imagers, third party logistics, automobile suppliers, automobile manufacturers, automobile distributors, automobile dealerships, computers, and networks, according to particular needs.

In one embodiment, production planner 110 comprises server 112 and database 114. According to embodiments, production planner 110 receives a demand or production forecast for vehicle model and options and determines a quantity and configuration of automobiles to be produced. Production planning may comprise a holistic approach that considers many or all aspects of a production planning problem by modeling the production plan as, for example, a linear program. Production planner 110 may then determine a quantity and configuration of automobiles to be produced by which manufacturing plants, for which markets, at which time periods based on automobile supply chain constraints and possible automobile configurations.

Automobile supply chain constraints used in the production planning problem may include, for example, flow constraints (i.e. the number of automobiles entering a node equals the number of automobiles leaving a node, or the total of starting stock and production equals the total of sales and ending stock), manufacturing plant constraints (e.g. capacity, lead time, and diversity), supplier capacity constraints, and minimum and maximum stock constraints. Each automobile configuration may be represented in the production plan by a serial number, code, or other alphanumeric string representing one or more, or all, of the possible options for an automobile configuration.

One or more imagers 120 comprise one or more electronic devices that receive imaging information from one or more sensors 126 or from one or more databases in supply chain network 100. According to embodiments, one or more imagers 120 comprise one or more processors 122, memory 124, one or more sensors 126, and may include any suitable input device, output device, fixed or removable computer-readable storage media, or the like. According to embodiments, one or more imagers 120 identify items near the one or more sensors 126 and generate a mapping of the item in supply chain network 100. As explained in more detail below, one or more third party logistics 130, suppliers 140, manufacturers 150, distributors 160, and dealerships 170 use the mapping of an item to locate the item in the supply chain network 100. The location of the item is then used to coordinate the storage and transportation of items in supply chain network 100 to implement one or more plans generated by production planner 110. Plans may comprise one or more of a production plan, demand plan, option plan, sales and operation plan, and master plan, as described herein.

One or more imagers 120 may comprise a mobile handheld device such as, for example, a smartphone, a tablet computer, a wireless device, or the like. In addition, or as an alternative, one or more imagers 120 comprise one or more networked electronic devices configured to transmit item identity information to one or more databases as an item passes by or is scanned by one or more imagers 120. This may include, for example, a stationary scanner located at one or more third party logistics 130, suppliers 140, manufacturers 150, distributors 160, or dealerships 170 that identifies items as the items pass near the scanner, including in one or more transportation vehicles 136. One or more sensors 126 of one or more imagers 120 may comprise an imaging sensor, such as, a camera, scanner, electronic eye, photodiode, charged coupled device (CCD), or any other electronic or manual sensor that detects or identifies images of automobiles or automotive components or reads labels, barcodes, or the like coupled with automobiles or automotive components. In addition, or as an alternative, one or more sensors 126 may comprise a radio receiver and/or transmitter configured to read an electronic tag coupled with an automobile or automotive component, such as, for example, an RFID tag.

Third party logistics 130 comprises server 132 and database 134. According to embodiments, third party logistics 130 directs one or more transportation vehicles 136 to ship one or more items between one or more third party logistics 130, suppliers 140, manufacturers 150, distributors 160, or dealerships 170, based, at least in part, on the quantities of a production plan determined by production planner 110. Transportation vehicles 136 comprise, for example, any number of trucks, cars, vans, boats, airplanes, unmanned aerial vehicles (UAVs), cranes, robotic machinery, or the like, In addition to the production plan, the number of items shipped by transportation vehicles 136 in third party logistics 130 may also be based, at least in part, on the number of items currently in stock at one or more third party logistics 130, suppliers 140, manufacturers 150, distributors 160, or dealerships 170, the number of items currently in transit, forecasted demand, a supply chain disruption, and the like. According to embodiments, transportation vehicles 136 may be associated with one or more suppliers 140, manufacturers 150, distributors 160, or dealerships 170, or another supply chain entity, according to particular needs.

As shown in FIG. 1, supply chain network 100 operates on one or more computers 180 that are integral to or separate from the hardware and/or software that support production planner 110 and one or more imagers 120, third party logistics 130, suppliers 140, manufacturers 150, distributors 160, and dealerships 170. Supply chain network 100 comprising production planner 110 and one or more imagers 120, third party logistics 130, suppliers 140, manufacturers 150, distributors 160, and dealerships 170 may operate on one or more computers 180 that are integral to or separate from the hardware and/or software that support the production planner 110 and one or more imagers 120, third party logistics 130, suppliers 140, manufacturers 150, distributors 160, and dealerships 170. Computers 180 may include any suitable input device 182, such as a keypad, mouse, touch screen, microphone, or other device to input information. Output device 184 may convey information associated with the operation of supply chain network 100, including digital or analog data, visual information, or audio information.

Computer 180 may include fixed or removable computer-readable storage media, including a non-transitory computer readable medium, magnetic computer disks, flash drives, CD-ROM, in-memory device or other suitable media to receive output from and provide input to supply chain network 100. Computer 180 may include one or more processors 186 and associated memory to execute instructions and manipulate information according to the operation of supply chain network 100 and any of the methods described herein. In addition, or as an alternative, embodiments contemplate executing the instructions on computer 180 that cause computer 180 to perform functions of the method. Further examples may also include articles of manufacture including tangible computer-readable media that have computer-readable instructions encoded thereon, and the instructions may comprise instructions to perform functions of the methods described herein. According to some embodiments, the functions and methods described in connection with imager 120 may be emulated by one or more modules configured to perform the functions and methods as described.

Production planner 110 and one or more imagers 120, third party logistics 130, suppliers 140, manufacturers 150, distributors 160, and dealerships 170 may each operate on one or more separate computers, a network of one or more separate or collective computers, or may operate on one or more shared computers. In addition, supply chain network 100 may comprise a cloud based computing system having processing and storage devices at one or more locations, local to, or remote from production planner 110 and one or more imagers 120, third party logistics 130, suppliers 140, manufacturers 150, distributors 160, and dealerships 170. In addition, each of the one or more computers 180 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with production planner 110 and one or more imagers 120, third party logistics 130, suppliers 140, manufacturers 150, distributors 160, and dealerships 170. These one or more users may include, for example, a "manager" or a "planner" handling production planning and/or one or more related tasks within supply chain network 100. In addition, or as an alternative, these one or more users within supply chain network 100 may include, for example, one or more computers programmed to autonomously handle, among other things, production planning, demand planning, option planning, sales and operations planning, order placement, automated warehouse operations (including removing automobile components from and placing automobile components in inventory), robotic production machinery (including building or assembling automobiles or automobile components), and/or one or more related tasks within supply chain network 100.

One or more third party logistics 130, suppliers 140, manufacturers 150, distributors 160, and dealerships 170 represent one or more automotive supply chain entities in one or more supply chain networks 100, including one or more enterprises. One or more third party logistics 130 may be any suitable entity that provides warehousing and transportation for automobile or automotive components in the automobile supply chain. Third party logistics 130 may, for example, receive an automobile or automotive component from a supply chain entity in the supply chain network and store and transport the automobile or automotive component for another supply chain entity. One or more third party logistics 130 may comprise automated warehousing systems that automatically remove automobile components from and place automobile components into inventory based, at least in part, on a production plan, demand plan, option plan, sales and operation plan, or master plan determined by production planner 110. Automotive components may comprise, for example, components, materials, products, parts, items, or supplies that may be used to produce automobiles or other automotive components. In addition, or as an alternative, an automotive component may comprise a part of the automobile or a supply or resource that is used to manufacture the automobile, but does not become a part of the automobile.

One or more suppliers 140 may be any suitable entity that offers to sell or otherwise provides one or more automotive components to one or more automotive manufacturers 150. Suppliers 140 may comprise automated distribution systems 142 that automatically transport automobiles and automotive components to one or more automotive manufacturers 150 based, at least in part, on a production plan, demand plan, option plan, sales and operation plan, or master plan determined by production planner 110 and/or one or more other factors described herein.

Automobile manufacturer 150 may be any suitable entity that manufactures at least one automobile or automotive component. Manufacturer 150 may use one or more automotive components during the manufacturing process to manufacture, fabricate, assemble, or otherwise process an automobile or automotive component. An automobile or automotive component may be supplied to another automobile manufacturer 150, third party logistics 130, supplier 140, distributor 160, and/or dealership 170 in the automobile supply chain network 110. Automobile manufacturer 150 may, for example, produce and sell an automobile or automotive component to supplier 140, another manufacturer 150, a distributor 160, dealership, 170 a customer, or any other suitable person or entity. Such automobile manufacturers 150 may comprise automated robotic production machinery 152 that produces automobiles and automobile components based, at least in part, on a production plan, demand plan, option plan, sales and operation plan, or master plan determined by production planner 110.

Distributor 160 may be any suitable entity that offers to sell or otherwise distributes at least one automobile or automotive component to one or more dealerships 170 and/or customers. Distributors 160 may, for example, receive a product from a first automotive supply chain entity in supply chain network 100 and store and transport the product for a second automotive supply chain entity. Such distributors 160 may comprise automated warehousing systems 162 that automatically transport to one or more dealerships 170 or customers and/or automatically remove from or place into inventory automobiles and automobile components based, based, at least in part, on a production plan, demand plan, option plan, sales and operation plan, or master plan determined by production planner 110. One or more dealerships 170 may be any suitable entity that obtains one or more automobiles or automotive component to sell to one or more customers. In addition, one or more dealerships 170 may sell, store, and supply one or more automotive components and/or repair an automobile with one or more automotive components. One or more dealerships 170 may comprise any online or brick and mortar location, including locations with shelving systems 172. Shelving systems 172 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more dealerships 170 based on computer-generated instructions or automatically by machinery to place automobiles or automotive components in a desired location.

Although one or more third party logistics 130, suppliers 140, manufacturers 150, distributors 160, and dealerships 170 are shown and described as separate and distinct entities, the same entity may simultaneously act as any one or more third party logistics 130, suppliers 140, manufacturers 150, distributors 160, and dealerships 170. For example, one or more automobile manufacturers 150 acting as a manufacturer could produce an automobile or automotive component, and the same entity could act as a supplier to supply an automobile or automotive component to another automotive supply chain entity. Although one example of a supply chain network 100 is shown and described; embodiments contemplate any configuration of supply chain network 100, without departing from the scope of the present disclosure.

In one embodiment, production planner 110 may be coupled with network 190 using communications link 191, which may be any wireline, wireless, or other link suitable to support data communications between production planner 110 and network 190 during operation of supply chain network 100. One or more imagers 120 are coupled with network 190 using communications link 192, which may be any wireline, wireless, or other link suitable to support data communications between one or more imagers 120 and network 190 during operation of distributed supply chain network 100. Third party logistics 130 may be coupled with network 190 using communications link 193, which may be any wireline, wireless, or other link suitable to support data communications between third party logistics 130 and network 190 during operation of supply chain network 100.

One or more suppliers 140 may be coupled with network 190 using communications link 194, which may be any wireline, wireless, or other link suitable to support data communications between one or more suppliers 140 and network 190 during operation of supply chain network 100. One or more manufacturers 150 may be coupled with network 190 using communications link 195, which may be any wireline, wireless, or other link suitable to support data communications between one or more manufacturers 150 and network 190 during operation of supply chain network 100. One or more distributors 160 may be coupled with network 190 using communications link 196 which may be any wireline, wireless, or other link suitable to support data communications between one or more distributors 160 and network 190 during operation of supply chain network 100. One or more dealerships 170 may be coupled with network 190 using communications link 197, which may be any wireline, wireless, or other link suitable to support data communications between one or more dealerships 170 and network 190 during operation of supply chain network 100. Computer 180 may be coupled with network 190 using communications link 198, which may be any wireline, wireless, or other link suitable to support data communications between computer 180 and network 190 during operation of supply chain network 100.

Although communication links 191-198 are shown as generally coupling production planner 110 and one or more imagers 120, third party logistics 130, suppliers 140, manufacturers 150, distributors 160, dealerships 170, and computer 180 to network 190, each of production planner 110 and one or more imagers 120, third party logistics 130, suppliers 140, manufacturers 150, distributors 160, dealerships 170, and computer 180 may communicate directly with each other, according to particular needs.

In another embodiment, network 190 includes the Internet and any appropriate local area networks (LANs), metropolitan area networks (MANs), or wide area networks (WANs) coupling production planner 110 and one or more imagers 120, third party logistics 130, suppliers 140, manufacturers 150, distributors 160, dealerships 170, and computer 180. For example, data may be maintained by locally or externally of production planner 110 and one or more imagers 120, third party logistics 130, suppliers 140, manufacturers 150, distributors 160, dealerships 170, and computer 180 and made available to one or more associated users of production planner 110 and one or more imagers 120, third party logistics 130, suppliers 140, manufacturers 150, distributors 160, dealerships 170, and computer 180 using network 190 or in any other appropriate manner. For example, data may be maintained in a cloud database at one or more locations external to production planner 110 and one or more imagers 120, third party logistics 130, suppliers 140, manufacturers 150, distributors 160, dealerships 170, and computer 180 and made available to one or more associated users of production planner 110 and one or more imagers 120, third party logistics 130, suppliers 140, manufacturers 150, distributors 160, dealerships 170, and computer 180 using the cloud or in any other appropriate manner. Those skilled in the art will recognize that the complete structure and operation of network 190 and other components within supply chain network 100 are not depicted or described. Embodiments may be employed in conjunction with known communications networks and other components.

In accordance with the principles of embodiments described herein, production planner 110 and/or one or more automotive supply chain entities may generate one or more supply chain plans, including a production plan, a demand plan, an option plan, a sales and operation plan, and a master plan, and modify the supply chain based on the generated plans. For example, according to some embodiments, production planner 110 automatically places orders for automobile or automotive components at one or more suppliers 140, manufacturers 150, or distributors 160, initiates manufacturing of the automobile or automotive components at one or more manufacturers 150, and determines automobile or automotive components to be carried at one or more dealerships 170. Furthermore, production planner 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, and proportional or alternative sourcing of one or more third party logistics 130, suppliers 140, manufacturers 150, distributors 160, and dealerships 170 based on one or more generated plans and/or current inventory or production levels. For example, the methods described herein may include computers 180 receiving product data from automated machinery having at least one sensor and the product data corresponding to an item detected by the automated machinery. The received product data may include an image of the item, an identifier, as described above, and/or other product data associated with the automobile or automotive component (dimensions, texture, estimated weight, and any other like attributes). The method may further include computers 180 looking up the received product data in database 114 associated with production planner 110 to identify the item corresponding to the product data received from the automated machinery.

Computers 180 may also receive, from the automated machinery, a current location of the identified automobile or automotive component. Based on the identification of the automobile or automotive component, computers 180 may also identify (or alternatively generate) a first mapping in the database system, where the first mapping is associated with the current location of the identified automobile or automotive component. Computers 180 may also identify a second mapping in the database system, where the second mapping is associated with a past location of the identified automobile or automotive component. Computers 180 may also compare the first mapping and the second mapping to determine if the current location of the identified automobile or automotive component in the first mapping is different than the past location of the identified automobile or automotive component in the second mapping. Computers 180 may then send instructions to the automated machinery based, as least in part, on one or more differences between the first mapping and the second mapping such as, for example, to locate automobile or automotive component to add to or remove from an inventory of one or more third party logistics 130, suppliers 140, manufacturers 150, distributors 160, and dealerships 170.

Figure 2:
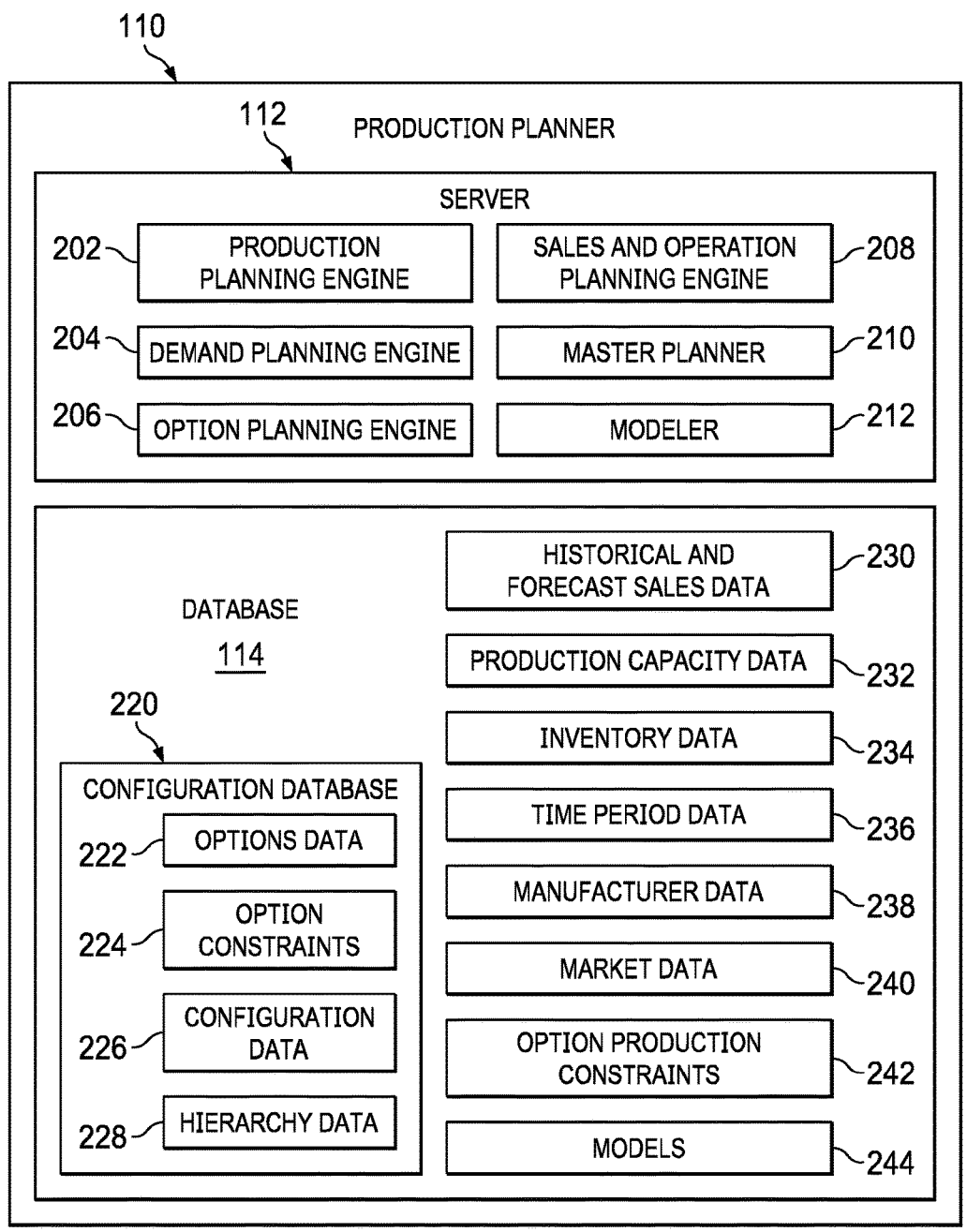
FIG. 2 illustrates the production planner of FIG. 1 in greater detail, in accordance with an embodiment.

FIG. 2 illustrates production planner 110 of FIG. 1 in greater detail, in accordance with an embodiment. As discussed above, production planner 110 may comprise server 112 and database 114. Although production planner 110 is shown and described as comprising a single server 112 and database 114, embodiments contemplate any suitable number of servers or databases internal to or externally coupled with production planner 110. In addition, or as an alternative, a production planner may be located internal or external to the one or more third party logistics 130, suppliers 140, manufacturers 150, distributors 160, and dealerships 170 according to particular needs.

According to embodiments, server 112 of production planner 110 may comprise production planning engine 202, demand engine 204, option engine 206, sales and operations engine 208, master planner 210, and modeler 212. In addition, database 114 of production planner 110 comprises a configuration database 220 (which comprises options data 222, option constraints 224, configuration data 226, and hierarchy data 228), sales forecast data 230, production capacity data 232, inventory data 234, time period data 236, manufacturer data 238, market data 240, option production constraints 242, and models 244. Although particular engines, planners, modelers, and databases are shown and described, embodiments contemplate any suitable number or combination of engines, planners, modelers, and databases located at one or more locations, local to, or remote from, production planner 110, according to particular needs. Furthermore, the engines, planners, modelers, and databases may be located at one or more locations, local to or remote from, production planner 110 such as on multiple servers or computers at any location in the supply chain network, such as networked among one or more third party logistics 130, suppliers 140, manufacturers 150, distributors 160, and dealerships 170.

Production planning engine 202 of server 112 may determine a production plan based, at least in part, on one or more constrained or unconstrained plans received from demand planning engine 204, option planning engine 206, and/or sales and operations planning engine 208. For example, production planner 110 may reconcile the option plan from option engine 206 according to the demand plan received from demand planning engine 204 and the sales and operations plan received from sales and operation engine 208, iteratively, to generate a production plan. In other words, production planner 110 may receive the demand plan, option plan, and sales and operations plan and refine each of the plans iteratively to generate a production plan.

According to embodiments, production planner 110 generates a production plan based, at least in part, on automobile configurations (including predefined vehicle configurations, which may be referred to as "predefined automobiles"), historical and forecast sales data 230, production capacity data 232, inventory data 234, time period data 235, manufacturer data 238, market data 240, option production constraints 242, and any other constraints in accordance with one or more models 244. The predefined automobiles may comprise, for example, a list of automobile configurations which may include a demand associated with particular options, configurations, or fully defined vehicles (FDV), as described in more detail below. Historical and forecast sales data 230 may comprise, for example, past and projected demand of sales organized according to any particular criteria, including automobile models, automobile options, automobile configurations, components, automobiles, markets, periods, and the like.

Production capacity data 232 may comprise data establishing the minimum and maximum capacity for production of one or more manufacturers 150 for automobile or automobile components over a given time period and may be associated with a lead time. Inventory data 234 may comprise the minimum and maximum number of automobiles models or automobile components that may be stored at various stocking points in the supply chain as well as the current or projected stock at each stocking point. According to embodiments, production planning engine 202 receives and transmits inventory data 234, including item identifiers, pricing data, attribute data, inventory levels, and other like data about one or more automobiles or automotive components between one or more locations in the supply chain network 100 including among one or more third party logistics 130, suppliers 140, manufacturers 150, distributors 160, and dealerships 170.

Time period data 236 may comprise, for example, any suitable time information, such as a planning period of weeks, months, days, years, quarter, or any other suitable time period over which one or more plan is determined. Importantly, time period information may be especially critical to the functionality of production planner 110 where a production planner may need to consider inputs over a long time period, such as, for example, between one and two years, or longer. Manufacturer data 238 may comprise data relating to the manufacturing plants for automobile or automobile components such as the markets served by each manufacturer 150, the distribution chains for each manufacturer 150, and the types of automobile and automobile components that may be manufactured at each manufacturer 150. Market data 240 may comprise data delineating the regions (geographic, economic, or otherwise) that are used to model distribution of automobile or automobile components.

Manufacturer data 238 and market data 240 may comprise, for example, the number, type, and location of automobile manufacturers 150 and the markets that those manufacturers 150 serve. For example, manufacturers 150 may be associated with a particular region where the manufacturer 150 operates, such as, the United States, Canada, Mexico, Europe, or any other geographical region, such as a state, country, or continent. Similarly, markets may be divided into any desired geographical region, such as by state, country, continent, or any other region. Markets may comprise, for example, the Americas, Europe, and Asia, or markets may comprise the United States, Mexico, and Canada. Any other combination of manufacturing plant and market information may be organized into any desired region, according to particular needs. Option production constraints 242 are related to the capability of the manufacturers 150 to produce options and may comprise production constraints such as, for example, production capacity for particular options. Demand planning engine 204 of server 112 may receive historical and forecast sales data 230, such as, for example, past and projected demand data and marketplace data from dealerships 170 and determine a demand plan, based, at least in part, on the received data.

Option planning engine 206 of server 112 may determine an option plan by associating constraints with options of automobile option packages according to options and configurations stored in configuration database 220. Options data 222 of configuration database 220 may comprise data identifying available options associated with the make and models of automobiles. Each option may be associated with a particular automobile or one or more options may be associated with one or more automobiles, according to particular needs. Options may comprise selectable or configurable features, components, or configurations of automobiles. For example, options may comprise selection of an engine, transmission, wheels, color, seats, head lamps, quality of materials (such as interior or exterior finish options), brakes, tires, intake, exhaust, spoiler, or other components or systems of an automobile. Options may comprise the absence or presence of any automotive component (such as, for example, having a spoiler or not having a spoiler) or may represent a particular configuration of any automotive component (such as, for example, having a V8 engine versus a 4-cylinder engine). Options may comprise a particular version or part number of a selected automotive component, which may vary based on geographical location, safety requirements, ruggedness, value (such as, for example, a premium versus an economy model), or like considerations.

One or more of the options may have relationships that define various combinations and permutations of options in a finished automobile and/or an automotive component. These relationships may be defined by option constraints 224 of configuration database 220. Option constraints 224 comprise limits and permissions for relationships between options, such as limits to which options may occur together in a configuration and which options may not occur together in a configuration. Option constraints 224 may require that certain options are always found in an automobile together, are never found in an automobile together, are dependent or independent of other options, must be found in specific ratios in the automobile, and other like rules and constraints. For example, option constraints 224 may include, for example, that "premium leather seating is only available with V-8 engine." Therefore, any option for premium leather seating would be allowed only if the option for V-8 engine also occurred in the same configuration. Embodiments contemplate any suitable option constraints 224, according to particular needs. Option planning engine 206 may use options constraints 224 to refine the demand plan of the demand planning engine, such that, the demand for options is compatible with supply chain constraints, such as, for example, option production constraints 244.

In addition, options constraints 224 may be assigned to options according to a hierarchy stored in hierarchy data 228. Hierarchy data 228 may comprise a priority associated with each option such that options with a higher priority are assigned to an automobile prior to an option with a lower priority. For example, a demand target for an option for a V8 engine may have a higher priority than a demand target for an option to include leather seats. If, for example, the demand for the V8 engine was 100 vehicles and for leather seats was 80 vehicles, and all vehicles with a V8 engine must also have leather seats, then, the demand for V8 engines will have a higher priority than the demand for leather seats. Accordingly, the production planner 110 may determine that the production targets would be 100 vehicles with both the V8 engine option and the leather seats option.

Each combination or permutation of automobile options may be termed a configuration stored as configuration data 226. A configuration may comprise any collection of one or more automobile options, such as particular lighting systems, engines, model type, wheels, or any component or part of an automobile that may be configured, including permitted and disallowed configurations of each automobile.

Sales and operations planning engine 208 of server 112 may determine a sales and operations plan based, at least in part, on option production constraints 242. According to embodiments, sales and operations planning engine 208 receives option production constraints 242 such as, for example, constraints covering production limits on select options. For example, production limits may be maximum supply available per a defined time horizon that is available to meet a particular demand volume. Embodiments contemplate that option production constraints 242 are defined by a combination of logical operators.

According to embodiments, demand planning engine 204 and option planning engine 206 determine an unconstrained demand plan and option plan. In one embodiment, sales and operations planning engine 208 receives an unconstrained demand and option plan as an input and then constrains the plan based on production limits and option compatibility. In addition, or as an alternative, the output of the sales and operations plan may comprise a constrained demand and option plan which may not equal the unconstrained plan. In addition, the sales and operations plan may be visible and applicable to all parts of supply chain network 100.

After the demand plan, option plan, and sales and operations plan are determined and production planning engine 202 generates a production plan, master planner 210 of server 112 may generate a master plan and communicate the master plan to one or more third party logistics 130, suppliers 140, manufacturers 150, distributors 160, and dealerships 170 to produce automobiles or automotive components according to the refined master plan. As an example only and not by way of limitation, master planner 120 may place orders with one or more third party logistics 130, suppliers 140, manufacturers 150, and distributors 160 to produce or ship automobile and automotive components according to the master plan and may communicate to dealerships 170 the quantity and options of automobiles and automotive components that will be produced and the date that the automobiles and automotive components will arrive at dealerships 170.

According to embodiments, the level of granularity in the master plan is different than the production plan. Master planning may comprise, for example, a buffer of an amount of material and an operation that processes or transforms the material into an item with a set quantity. Embodiments of production planner 110 determine a production plan comprising a higher level of granularity than master planning. After the one or more inputs described above are received by production planner 110, modeler 212 of production planner 110 may determine a production plan utilizing one or more models 244.

Models 244 of the database may comprise any suitable model of an automobile supply chain. According to some embodiments, the models comprise a network model comprising nodes and arcs where nodes represent manufacturers 150, automobile configurations, and markets and arcs represent the movement of automobile stock, as described in more detail below. According to other embodiments, models 244 comprise a mixed integer linear programming MIP model with variable aggregation. According to further embodiments, models 244 comprise a well-structured MIP model comprising three sub-models: a network production sub-model, an option capacity model, and a linking constraints model.

Figure 3:
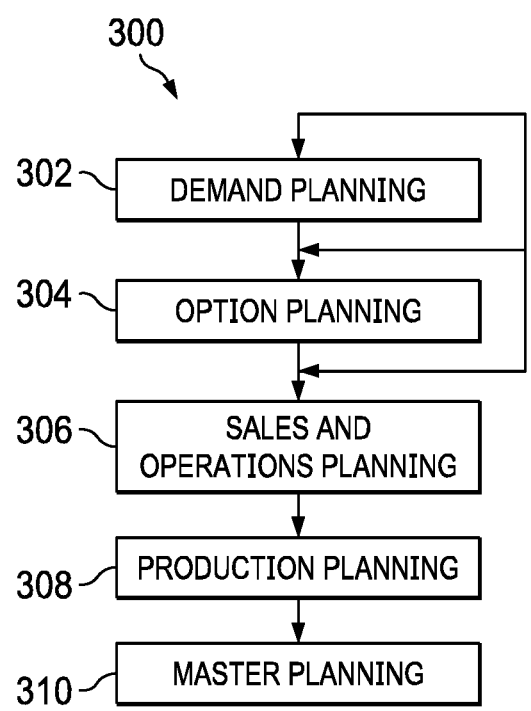
FIG. 3 illustrates an exemplary method of automobile configuration planning according to an embodiment.

FIG. 3 illustrates an exemplary method 300 of automobile configuration planning according to an embodiment. Although automobile configuration planning is depicted as a linear process, one or more actions may be performed in any order, combination, or repetitions to perform automobile configuration planning. For example, demand planning 302, option planning 304, and sales and operations planning 306 may comprise iterative processes that are performed multiple times in various orders, such that the demand plan, the option plan, and sales and operations plan inform and refine each other according to sales forecast data 230, production capacity data 232, inventory data 234, time period data 236, manufacturer data 238, market data 240, models 232, option production constraints 244, options data 222, options constraints 224, configuration data 226, and hierarchy data 228. However, during demand planning 302, option planning 304, and sales and operations planning 306, the determined plans generally have few initial constraints, which helps generate plans directed to what the automobile manufacturer 150 would like to build, not necessarily what they are able to build. As the planning proceeds through further actions, more constraints are added or removed to further align a desired plan with a feasible plan.

At action 302, demand planning engine 204 generates a demand plan from a global consolidated view of market demand and production requirements. Demand planning engine 204 may receive historical and forecast sales data 230, option production constraints 244, and the like and generate a demand plan, which may include projected demand for one or more automobiles and automotive components. A demand plan may include a preliminary assessment of data received from dealerships 170, such as, for example, demand for types and quantities of automobiles and automotive components. Production planner 110 may communicate the generated demand plan to the option planning engine 206 and sales and operations planning engine 208.

At action 304, option planning engine 206 may determine the take rates and volumes of automobiles and automotive components at the option level. Option planning engine 206 may refine the demand plan according to the mix or the interaction between available automobile options. After action 304, production planner 110 may return to action 302 and iteratively refine the demand plan according to the option plan, such as analyzing the available options and returning to the demand plan to alter take rate percentages.

In addition, or in the alternative, production planner 110 may continue to action 306. At action 306, sales and operations planning engine 208 may generate a sales and operation plan optimized to fulfill market demand and generate forecast orders. For example, sales and operations planning engine 208 may refine the option plan according to production capacity data 232, incrementally, so that, for example, a sales and operation plan is substantially refined according to the demand plan.

At action 308, production planning engine 202 communicates with third party logistics 130, suppliers 140, manufacturers 150, distributors 160, dealerships 170 and/or other automotive supply chain entities to generate a production plan that is optimized based on market demand while respecting constraints according to models 244. The production plan may determine, for example, which automobiles are to be produced for particular markets, at which manufacturers 150, for each of one or more time periods. The production plan may be based on overall sales forecasts and respects supplier 140 and manufacturer 150 production capacity constraints. After the one or more inputs described above are received by production planner 110, modeler 212 of production planner 110 may determine a production plan utilizing one or more models 244 as described below.

At action 310, master planner 210 generates a master plan for production of automobiles and automobile components. For example, master planner 210 may generate a master plan that determines which automobiles and automotive components will be produced during a specific time frame or planning horizon, and the order or priority of the automobiles and automotive components produced. As discussed herein, production planning engine 202 generates a production plan that is optimized based on market demand while respecting constraints according to models 244. The models described below include: a network model, a MIP model with variable aggregation, and a well-structured MIP model.

Models 244 may include one or more constraints. For example, models 244 may include one or more sales forecast constraints, production capacity constraints, supplier and production capacity constraints for option definition sets, and the like. A sales forecast constraint may comprise requiring that the inventory at the end of the previous planning period plus the production during the current planning period minus the inventory at the end of the current planning equals the sales forecast for the current planning period. The sales from a specific period may be shuffled to obtain what remains in stock so that the equation may be represented by the previous stock added to what is produced and subtracting what is sold is equal to the new stock for a given period. Production capacity constraints may comprise limiting the number of vehicles of a vehicle model (sedan or SUV for example) produced at a manufacturer 150 by the capacity of each plant of the manufacturer 150. Production capacity constraints are defined for each manufacturing plant, each period, and each vehicle model. Supplier and production capacity constraints may be defined for option definition sets (ODS) and for each period. Each of the constraints in models 244 may be defined by ODS and time period. An ODS represents a particular automobile sub-configuration (for instance, a black sedan with a V8).

According to embodiments, ODS comprise rules that target some options for one or more configurations. For example, some manufacturers 150 may be restricted for a particular option, such as a big engine, which limits the amount of production for a particular configuration comprising that option. ODS match automotive configurations and options which are represented by a FDV. By way of further explanation an example is not given.

TABLE 1

| Quantity | Market | Period | Model |
|---|---|---|---|
| 100 | USA | 1 | Sedan |
| 97 | USA | 2 | Sedan |
| 90 | USA | 3 | Sedan |
| 100 | USA | 4 | Sedan |
| 50 | USA | 5 | Sedan |
| 65 | USA | 6 | Sedan |
| 120 | USA | 7 | Sedan |

TABLE 1-continued

| Quantity | Market | Period | Model |
|---|---|---|---|
| 100 | USA | 8 | Sedan |
| 110 | USA | 9 | Sedan |
| 102 | USA | 10 | Sedan |

TABLE 1 illustrates a sales forecast for a single market for a single automobile model for ten upcoming time periods. Unlike other production planners that determine particular options to be produced, embodiments of the current disclosure generate production plans based on high-level sales forecasts comprising automobile, manufacturing plant, market, period information, such as from marketing or analysis from an automobile manufacturer 150. According to the example illustrated, a sedan is needed in a quantity of 100 automobiles for the USA market on period 1. After the high-level sales forecasts are received by the production planner, the production planner receives predefined automobiles, which may comprise, for example, a list of automobile configurations and a demand associated with particular options, configurations, or fully defined vehicles (FDV).

TABLE 2

| FDV |
|---|
| Sedan V8 RadioA Sunroof |
| Sedan V8 RadioB Sunroof |
| Sedan V6 RadioA noSunroof |
| Sedan V6 RadioA Sunroof |
| Sedan V6 RadioB noSunroof |
| Sedan V6 RadioC Sunroof |

As illustrated in TABLE 2, each of the FDV comprise codes that precisely define the configuration of each automobile. Each configuration may be represented by a string of letters and numbers that identify configuration options such as: automobile model, engine, radio, lights, color, braking system, or any other like automobile configuration options. Although the FDVs illustrated in TABLE 2 include options for model (Sedan), engine (V8/V6), radio (RadioA, RadioB, and RadioC), and sunroof (Sunroof/No Sunroof), embodiments contemplate a FDV code comprising any string of text, numbers, logical operators, or the like that precisely define most or all of the options present on a vehicle. Additionally, the production planner may receive sales forecasts associated with FDV, but, in most instances, the production planner will receive sales forecasts associated with particular options or combinations of options, which are defined by ODS.

ODS may be used to associate a FDV to a production option constraint. This constraint may be, for example, a capacity (upper bound) or a desired target. For example, in the following TABLE 3, various ODS have production limits for various weekly time periods, according to the following:

TABLE 3

| ODS | 2015/W36 | 2015/W37 | 2015/W38 | 2015/W39 | 2015/W40 | 2015/W41 |
|---|---|---|---|---|---|---|
| Black SUV with V8 | 1327 | 1164 | 1406 | 1300 | 1406 | 1300 |
| Any model with V6 | 4617 | 4049 | 4892 | 4524 | 4892 | 4524 |
| Sedan with a sunroof but without spoiler | 1616 | 911 | 1100 | 1017 | 1100 | 1017 |
| SUV with a radio A | 1750 | 1306 | 1630 | 1750 | 1058 | 1600 |
| All sedans and pickups | 652 | 1000 | 1000 | 175 | 1025 | 650 |
| SUV with a 4 cylinders | 3800 | 3361 | 3240 | 3122 | 3323 | 3362 |

TABLE 3 illustrates ODS associated with the production capacities for particular time periods. For example, according to TABLE 3, the ODS "Black SUV with V8" which represents all SUVs that are black and have a V8 engine, is limited to 1,327 automobiles in the 36th week of 2015 and to 1,164 automobiles in the 37th week of 2015. This option definition set represents that, regardless of any configurations of available options (and many options will fall under the ODS: Black SUV with V8), the production limit for all configurations whose FDV matches the ODS in the chart is limited by the associated production capacity at each listed time period.

By way of a further example, in Row 4, the ODS "SUV with a radio A" represents one type of automobile and one type of radio. Any FDV that comprises SUV AND radio A will be associated with the production capacity constraint that the total of all SUVs with the radio A is limited to 3,800 automobiles in the 36th week of 2015 and 3,361 in the 37th week of 2015. If, however, the radio A was used in another type of automobile, its production capacity would not be limited by the production capacity listed in the chart because the ODS would not match the FDV associated with that automobile configuration. Although the production capacity constraints in TABLE 3 are associated with time periods expressed in weeks, embodiments contemplate any suitable time period, such as hours, days, months, quarters, years, or any other suitable period of time.

According to an embodiment, the number of particular FDV entries for an automobile manufacturer may exceed 1,000,000 entries. The large number of entries creates scalability problems for many types of production planners. Other described mixed integer problem models may not be scalable to the number of options provided in an automobile configuration context. According to some embodiments, production planner 110 uses variable aggregation to limit or reduce the number of automobile models analyzed by the model by constructing a novel data structure that limits the number of automobile configurations. This novel data structure is designed to improve the way a computer stores and retrieves data in memory.

According to some embodiments, variable aggregation may be used to aggregate many automobile configurations that end up as being equivalent. As an example only and not by way of limitation, assuming among all constraints targeting SUVs, the constraints fall into two categories: (A) constraints that target SUVs; and (B) constraints that target black SUVs. It may then be possible to eliminate some configurations of SUVs in the model. Therefore, production planner 110 may create two variables (or declinations of the FDVs): (1) the subset of all non-black SUVs; and (2) the subset of all black SUVs. Therefore, for constraints relating to (A) SUVs, production planner 110 uses variables (1) and (2) because this represents the integration of all SUVs (black and non-black), and, for constraints relating to (B) black SUVs, production planner 110 uses only variable (2). This provides for considering all configurations of SUVs because the constraints are limited to only that level of detail.

In other embodiments, if the constraints are defined in relation to SUVs with options for the radio, transmission, sunroof, and other like options, then production planner 110 would construct additional declinations of FDVs for the additional subgroups of SUVs, and the model would result in more variables. However, when the constraints are limited to particular ODS, and even when there are many of them, production planner 110 will work faster by working with much less than the 1,000,000 FDVs, if they are not aggregated.

The following examples illustrate construction of an automobile supply chain network with automobile aggregation, according to an embodiment.

Figure 4:
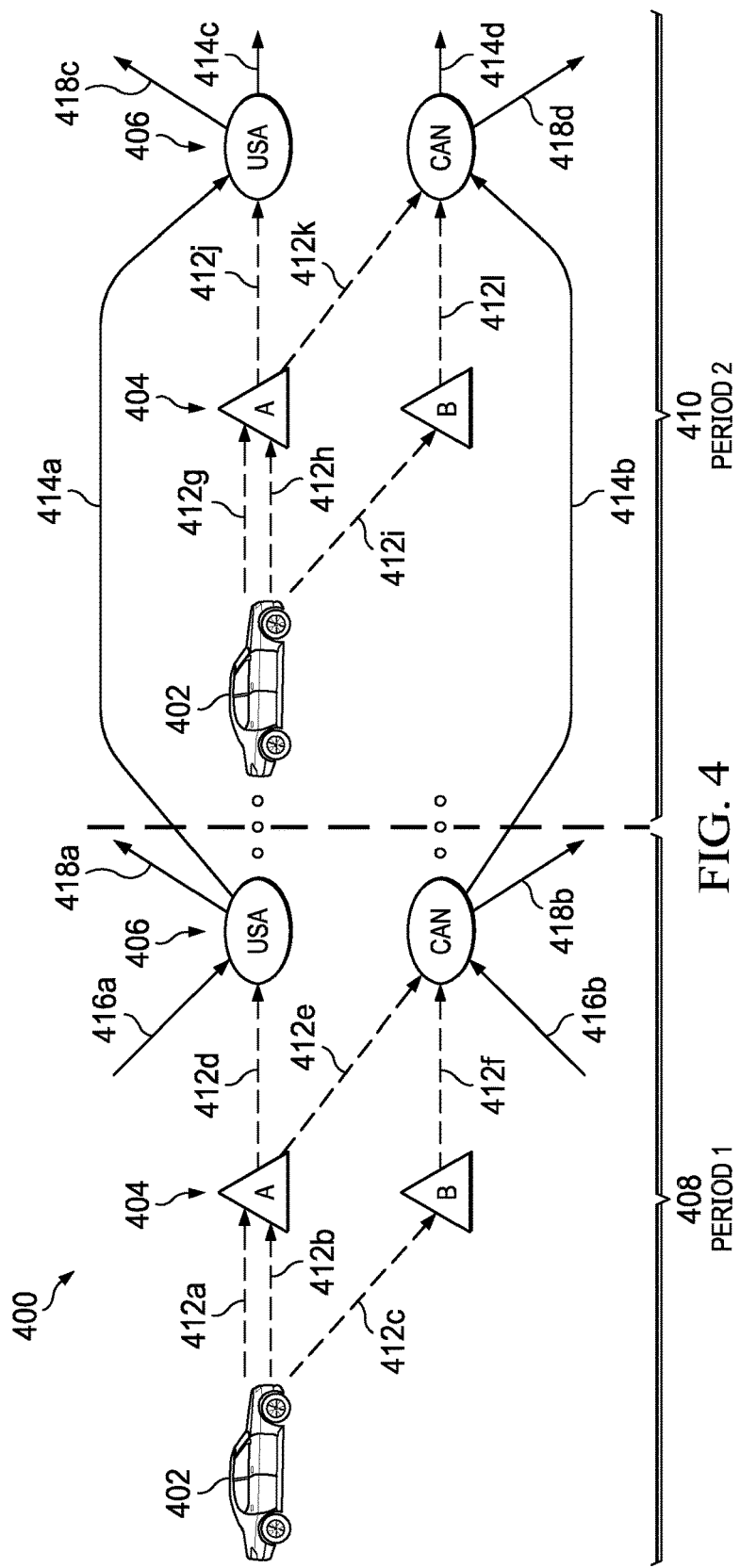
FIG. 4 illustrates a graphical representation of a network model of the automobile supply chain network, according to an embodiment.

FIG. 4 illustrates a graphical representation of a network model 400 of the automobile supply chain network, according to an embodiment. According to embodiments, network model 400 represents one or more relationships between variables and constraints using nodes and arrows. For example, vehicle model 402 may be produced by one or more manufacturing plants 404 for one or more markets 406 during a first planning period 408 and a second planning period 410. Each of the short arrows 412a-412l in the tree chart at the top represents one instance of the variable $x_{vehicle\ model, plant, market, perod}$, which represents the number of an automobile model at a particular manufacturing plant for a particular market in a particular time period. A second variable in the model is the stock variable, $s_{vehicle\ model, market, period}$. The stock variable represents an amount of stock for an automobile model at a time period for a particular market. In the tree chart, the arrows 414a-414b represent the stock variable, which may represent carryover stock that is carried over from one period to another, such as from a first period 408 to a second period 410. Each of the manufacturing plants 404 may have an initial stock during a first period 408, which is represented by the diagonal arrows 416a-416b. Each of the manufacturing plants 404 may also have sales of automobiles during each period 408-410, which is represented by the diagonal arrows 418a-418d.

The vehicle model 402 may represent an imprecise configuration of an automobile, because the stock constraints are not completely defined in the automobile. The vehicle model 402 may represent an amount of an automobile class (such as a sedan) in a specific market 406, but is not specific to which variant of sedan it is, or the complete configuration of that automobile.

The following example illustrates graphically the generation of a linear programming problem according to an embodiment using the network model 400 of the production plan. By way of example only and not by way of limitation, assume that the production is planned for building a sedan vehicle model 402 for two time periods 408-410 (such as, for example, January and February) in two different markets 406 (USA and Canada). Further assume that there are two manufacturing plants 404, Plant A and Plant B. Plant A produces for both markets 406 (USA and Canada), and Plant B produces only for the Canadian market. Continuing with the example, assume the sedan vehicle model 402 has three options, each with two choices for the option, according to the following:

TABLE 4

| Class: Sedan | | |
|---|---|---|
| Option | Choice 1 | Choice 2 |
| Engine | V8 | 4 cylinder |
| Sunroof | Yes | No |
| Spoiler | Yes | No |

This gives eight possible configurations:

TABLE 5

| |
|---|
| Sedan, V8, spoiler |
| Sedan, 4 cyl., spoiler |
| Sedan, V8, sunroof, spoiler |
| Sedan, 4 cyl., spoiler, sunroof |
| Sedan, V8 |
| Sedan, 4 cyl. |
| Sedan, V8, sunroof |
| Sedan, 4 cyl., sunroof |

Because the example of FIG. 4 only focuses on the sedan, without regard to the options, the vehicle model 402 can be represented using only one automobile class in the model: a sedan with any option. The total production of the sedan will then be split between the eight possible automobile configurations in a post process.

Assume further that the sales forecast, the minimum and maximum inventory (Min-Max Stock Target), the initial inventory, and the production capacity (in vehicles) are only on the sedan vehicle model 402 for the January and February planning periods 408-410 in the USA and Canadian markets 406, according to TABLES 6 and 7.

TABLE 6

| | January | | February | |
|---|---|---|---|---|
| | USA | Canada | USA | Canada |
| Sales Forecast | 650 | 300 | 700 | 550 |
| Min-Max Inventory Target | 450-500 | 375-400 | 500-550 | 400-425 |
| Initial Inventory | 50 | 25 | N/A | N/A |

TABLE 7

| | January | | February | |
|---|---|---|---|---|
| Manufacturer | PLANT A | PLANT B | PLANT A | PLANT B |
| Production Capacity | 500 | 400 | 600 | 500 |

Figure 5:
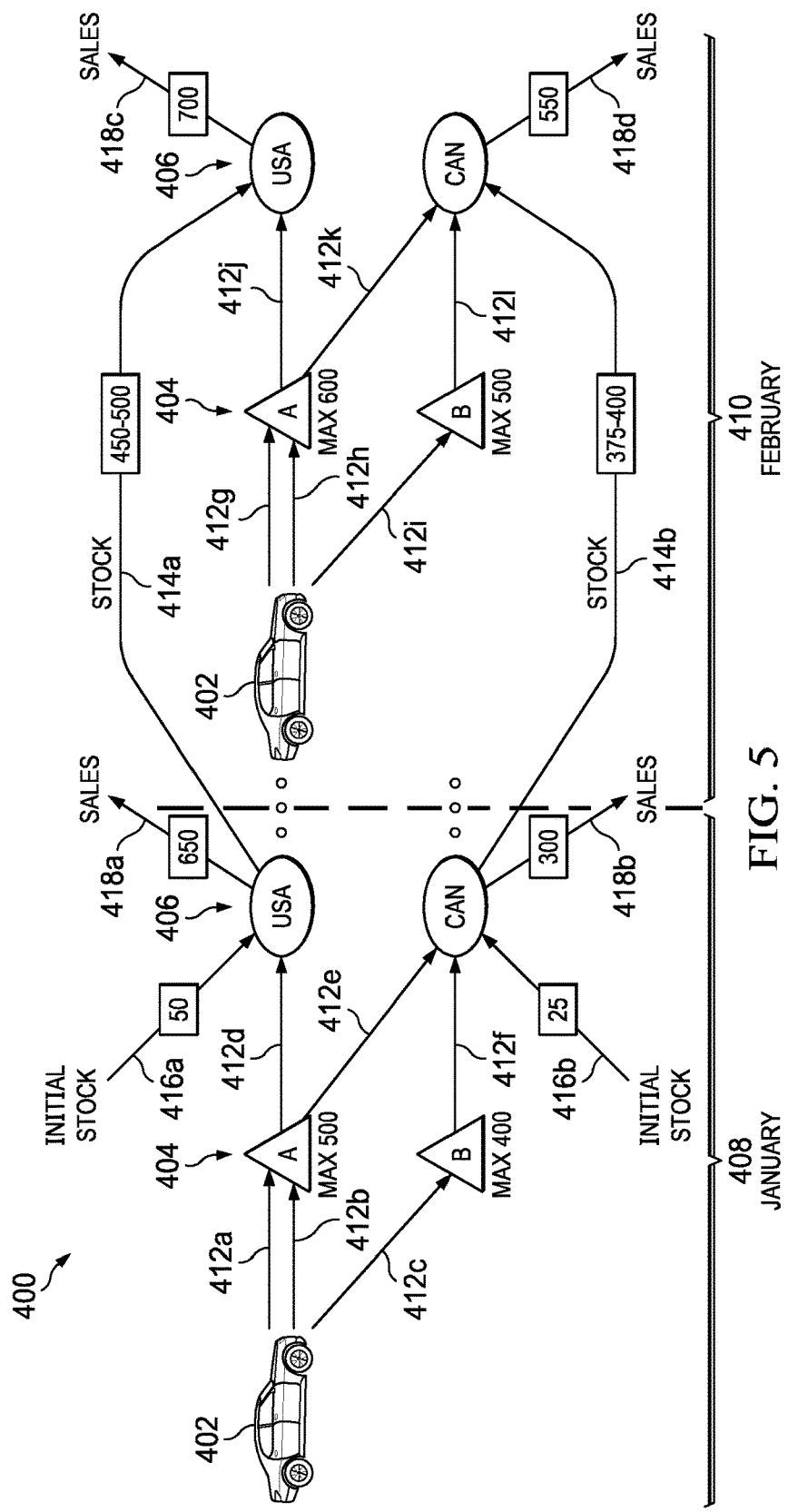
FIG. 5 illustrates the flow of production of a single automobile model through the exemplary network model of FIG. 4, according to an embodiment.

FIG. 5 illustrates the flow of production of a single automobile model through the exemplary network model of FIG. 4 with various constraints indicated, according to an embodiment. In the graphical representation of a network model 400, sales for each market 404 for all sedan configurations are indicated by arrows 418a-418d pointing outward from the ellipses representing the markets 404 (USA and CAN). Sales indicate the number of automobiles of all vehicle models 402 sold for each market 406 in each time period 408-410. For example, sales for January for the USA market are indicated as 650 automobiles, and for the Canadian market as 300 automobiles. Sales for February are 700 automobiles for the USA market and 550 automobiles for the Canadian market.

In addition to sales, production capacity may also be added to the model. Production capacity, represented by "Max" and a number beneath each manufacturing plant 404, indicated by triangle labeled A and B (representing Plant A and Plant B), identify the maximum production capacity for all sedan configurations for each time period 408-410 and for each manufacturing plant 406. For example, the maximum capacity for Plant A to build all sedan configurations is 500 automobiles in January and 600 automobiles in February. Similarly, the maximum capacity for Plant B to build all sedan configurations is 400 automobiles in January and 500 automobiles in February.

In addition to production capacity, the minimum and maximum stock for each market 408-410 and manufacturing plants 404 may be added to the network model 400. Minimum and maximum stock, represented by arrows 414a-414b indicate a numerical range for the minimum and maximum number of automobiles that may be held in stock from one period to the next. For example, the number of sedans of all configurations that may be held in stock between January and February for the USA market ranges between a minimum of 450 automobiles and a maximum of 500 automobiles. Similarly, the number of sedans of all configurations that may be held in stock between January and February for the Canadian market ranges between a minimum of 375 automobiles and a maximum of 400 automobiles.

In addition to the minimum and maximum stock, initial stock for each manufacturing plant 404 and market 406 may be added to the model. Initial stock, indicated by arrow 416a-416b pointing to each market 406 in the January time period, indicates the number of automobiles that are held in stock at each manufacturing plant 404 or market 406 at the beginning of the planning horizon. For example, the amount of sedans of all configurations that are initially in stock for January in the USA market is 50 automobiles. Similarly, the amount of sedans of all configurations that are initially in stock for January in the Canadian market is 25 automobiles.

At this point, production planner 110 may generate a mixed integer linear program that may solve for the number of sedans that are to be built by each manufacturing plant 404 and shipped to each market 406 for each time period 408-410. After the one or more inputs described above are received by production planner 110, production planner 110 may utilize a MIP model to determine a production plan. The MIP model may comprise the decision variable, $x_{vpmt}$, the volume of vehicle model 402 $v \in V$ produced at manufacturing plant 404 $p \in P$ for market 406 $m \in M$ at time period 408-410 $t \in T$, and the following constraints (1)-(3):

$$\text{stock}_{ml(t-1)} + \sum_{p}^{P} \sum_{v \in l} x_{vpmt} - \text{stock}_{mlt} = \text{sales forecast } \forall \, m, \quad (1)$$
$$l \in L, t$$

$$\sum_{m}^{M} \sum_{v \in l} x_{vpmt} \le \text{plant production capacity } \forall \, p, l \in L, t \quad (2)$$

$$\sum_{v \in OD} \sum_{p} \sum_{m} x_{vpmt} \le \text{capacity}_{(ODS)t} \, \forall \, ODS \in ODSs, t \quad (3)$$

where, L represents the vehicle model set, and ODS represents an Option Data Set. The first constraint (1) of the MIP model depicted above represents sales forecasts where the stock at the end of the last period plus the production minus the stock at the end of the first period equals the sales forecast. The sales from a specific period may be shuffled to obtain what remains in stock so that the equation may be represented by the previous stock added to what is produced and subtracting what is sold is equal to the new stock for a given period.

The second constraint (2) of the MIP model represents the production capacity constraints. The number of vehicles of a model (sedan or SUV for example) produced at a manufacturing plant 404 is limited by the capacity of this manufacturing plant 404. These constraints are defined for each manufacturing plant 404, each period 408-410, and each vehicle model 402.

The third constraint (3) of the MIP model is based on an option definition set (ODS). For each option definition set, there is a supplier/production capacity constraint. These constraints are defined for each option definition set and for each period.

In this MIP model, all constraints may be soft by adding under and over slack variables. The slack variables may then be added into the objective function and minimized with a descendant priority of: sales forecast, production capacities, option capacities, and initial stock. Although the MIP model is described with a descendent priority, embodiments contemplate a database structure that provides for reordering the priority of each variable or constraint according to particular needs. For example, sales forecast is currently indicated as having a highest priority. However, by altering the formation of the database that stores the sales forecasts, a different constraint may be placed in a higher priority than the sales forecasts. In addition, or as an alternative, in order to produce the most automobiles as possible, a penalty may be associated with any result that produces less automobiles than fixed by the MIP model.

Continuing with the same example above, assume that there is an additional constraint comprising a sales forecast for a "sedan with a spoiler" that is 90 sedans with spoilers in January and 100 sedans with spoilers in February. According to the exemplary network model 400 that was just described, the automobile represents all configurations of a sedan by a single vehicle model 402. Therefore, to add this constraint, the production planner 110 must split the single vehicle model 402 into two automobile classes: sedans WITH a spoiler and sedans WITHOUT a spoiler, according to the following:

TABLE 8

| Class: Sedan | |
| --- | --- |
| With Spoiler | Without Spoiler |
| Sedan, V8, spoiler | Sedan, V8 |
| Sedan, 4 cyl., spoiler | Sedan, 4 cyl. |
| Sedan, V8, sunroof, spoiler | Sedan, V8, sunroof |
| Sedan, 4 cyl., spoiler, sunroof | Sedan, 4 cyl., sunroof |

With this new constraint that targets the option "spoiler," the network model 400 must now make a distinction between a sedan with a spoiler and a sedan without a spoiler. Four automobile configurations (the ones with spoilers) will be linked to the automobile "sedan with spoiler," and the other four automobile configurations (the ones without spoilers) will be linked to the automobile "sedan without spoiler." The total production of "sedan with spoiler" will then be split between the four possible automobile configurations with spoiler in a post process. The same process will be done with the "sedan without spoiler." The additional spoiler option production capacity constraint may be added to the model as illustrated in the following figure.

Figure 6:
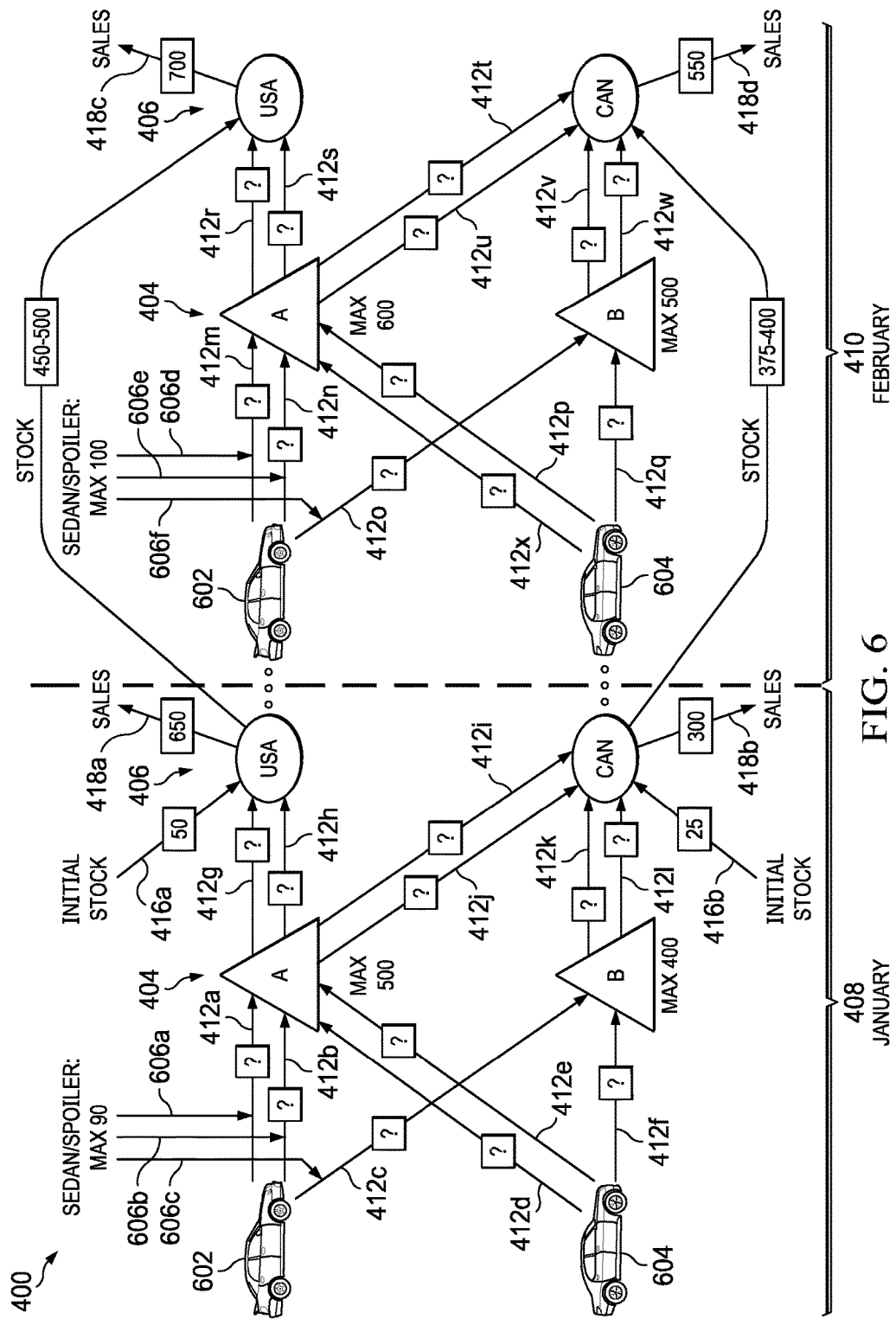
FIG. 6 illustrates the flow of production of two automobile models through the exemplary network model of FIG. 4, according to an embodiment.

FIG. 6 illustrates the flow of production of two automobile models through the exemplary network model 400 of FIG. 4 with various constraints indicated, according to an embodiment. To add the additional option production capacity, the automobile that was represented by a single automobile icon is now split into two automobile icons 602-604: one that represents sedans with spoiler 602, and the other one that represents sedans without spoiler 604. The market sales demand for the sedan with the spoiler indicated by arrows 606a-606c may be placed on the arrows 412a-412c connecting the sedan with spoiler icon 602 to the manufacturing plant 404 that can produce the sedan with spoiler in the first period 408. Similarly, the market sales demand for the sedan with the spoiler indicated by arrows 606d-606f may be placed on the arrows 412m-412o connecting the sedan with spoiler icon 602 to the manufacturing plant 404 that can produce the sedan with spoiler in the second period 410. Here, the number of sedans with spoiler is indicated as a maximum of 90 automobiles for January, and a maximum of 100 automobiles for February.

Once all constraints are modeled, production planner 110 may generate an optimization solution based on known amounts (i.e. sales, production capacity, minimum and maximum stock, initial stock, and/or option production capacity). Production planner 110 determines the flow on each production flow arrow 412a-412x in the above graphic to satisfy the constraints arrows 414a-414b, 416a-416b, 418a-418d, and 606a-606f, while respecting the conservation of flow (i.e. that the flow entering a node must equal the flow leaving the node). To perform this determination, production planner 110 transforms the chart into a linear program and solves it with, for example, a simplex algorithm, according to one or more mathematical models, as explained in detail above. By way of a further example of a graphical network model 400 consider the following.

Figure 7:
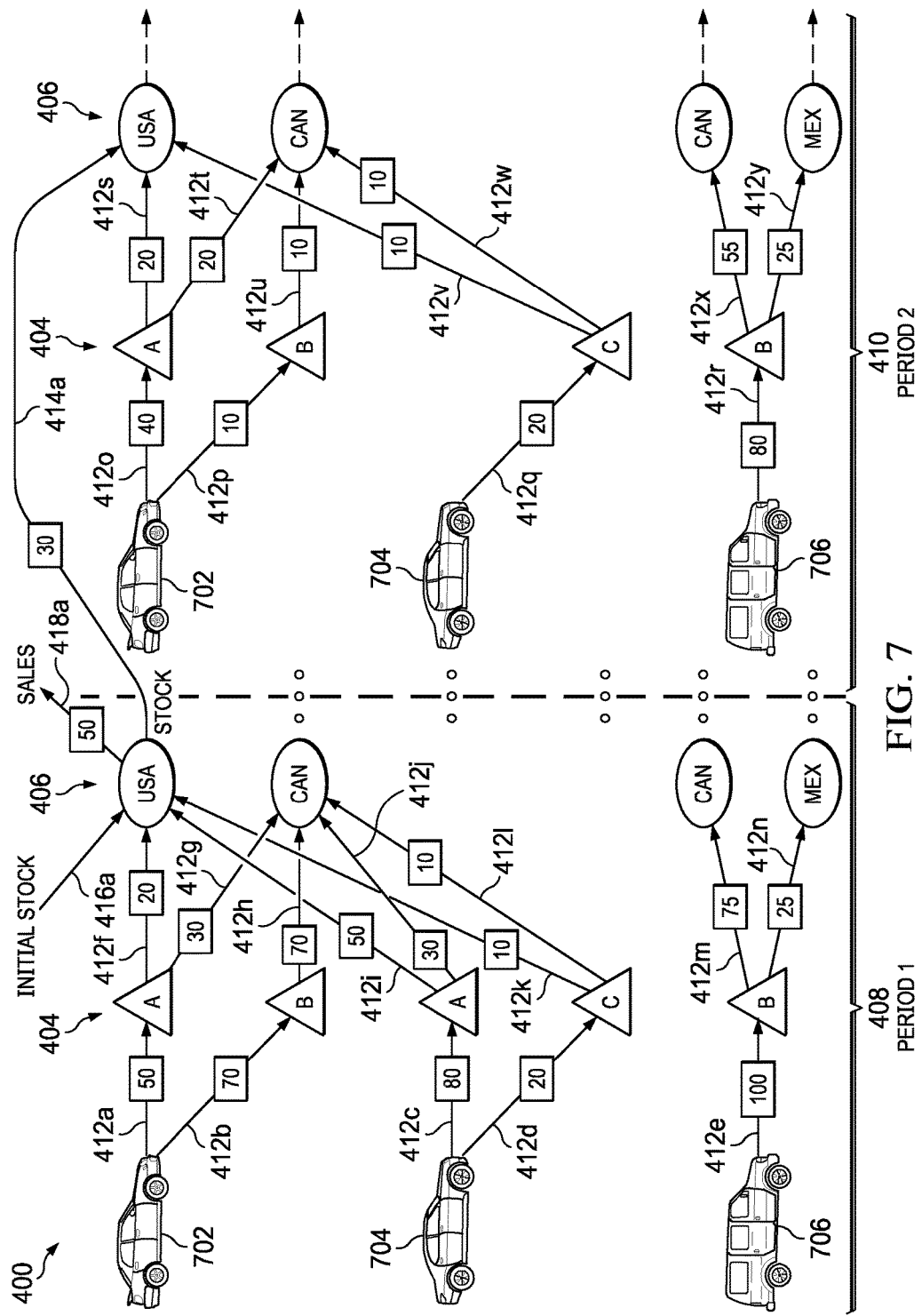
FIG. 7 illustrates the flow of production of two automobile models with three configurations through the exemplary network model of FIG. 4, according to an embodiment.

FIG. 7 illustrates the flow of production of two automobile models with three configurations through the exemplary network model 400 of FIG. 4 with various constraints indicated, according to an embodiment. A first automobile configuration 702 is a sedan model with a spoiler, the second automobile configuration 704 is a sedan model with upgraded wheels, and the third vehicle configuration 706 is a hatchback model. The triangles represent automobile manufacturing plants 404, the ellipses represent destination markets 406, and the arrows 412a-412y connecting the automobile configurations 702-706, manufacturing plants 404, and markets 406 represent the allocation of automobiles among the various manufacturing plants 404 and markets 406. The tree chart is also divided into two periods, a first period 408 (Period 1) on the left side, and a second period 410 (Period 2) on the right side.

During the first period 408, Period 1, the arrow 412a connecting the first automobile configuration 702 (sedan model with spoiler) to Plant A represents that Plant A will produce 50 automobiles of the first configuration. The arrow 412b connecting the first automobile configuration 702 to Plant B represents that Plant B will produce 70 automobiles of the first configuration. Similarly, Plant A will produce 80 automobiles of the second configuration 704 (sedan model with upgraded wheels) and Plant C will produce 20 automobiles of the second configuration 704. Also, Plant B will produce 100 automobiles of the third configuration 706 (hatchback).

The arrows 412f-412n connecting manufacturing plants 404 to markets 406 represent the automobile configurations shipped from those manufacturing plants to the markets indicated. For example, the uppermost arrow 412f connecting Plant A to the USA market indicates that 20 automobiles of the first configuration 702 will be shipped from Plant A to the USA market. Similarly, the network model 400 indicates that 30 automobiles of the first configuration 702 will be shipped from Plant A to the Canadian market. Continuing with the example, Plant B will produce 70 automobiles of the first configuration 702 for the Canadian market and no automobiles of the first configuration 702 for the USA market. Plant A will also produce 50 automobiles of the second configuration 704 for the USA market and 30 vehicles for the Canadian market. Plant C will produce 10 automobiles of the second configuration 704 for the USA market and also produce 10 automobiles for the Canadian market. Finally, Plant B will produce 75 automobiles of the third configuration 706 for the Canadian market and 25 automobiles for the Mexican market.

Also, some amount of initial stock may be present in Period 1 for the USA market for the first automobile configuration. This is indicated by "Initial Stock" and an arrow 416a pointing at the USA market for the first automobile configuration 702. The network model 400 indicates that 50 automobiles were sold from this first time period by arrow 418a, and the arrow 414a from the USA ellipse in Period 1 to the USA ellipse in Period 2 represents unsold stock (30 automobiles) that is carried over from Period 1 408 to Period 2 410.

For Period 2, a similar production plan is determined based on the automobile configurations 702-706, manufacturing plants 404, and the destination markets 406, and including any unsold stock from Period 1. For example, in the second period 410, Period 2, 40 automobiles of the first automobile configuration 702 will be produced by Plant A and 10 automobiles of the first automobile configuration 702 will be produced by Plant B. Plant C will produce 20 automobiles of the second configuration 704, and Place B will produce 80 automobiles of the third configuration. 706. Similar to Period 1, production planner will determine automobile allocation from each manufacturing plant 404 to different destination markets 406 based on particular automobile configurations 702-706. For example, 20 automobiles of the first configuration 702 will be shipped from Plant A to the USA, and 20 automobiles of the first configuration will be shipped from Plant A to the Canadian market. The allocation of the remaining automobiles is indicated. After all constraints are input into the model, production planner 110 may determine a production plan using the MIP model described and comprising the number of automobiles to produce at particular plants shipped to particular regions during particular time periods.

Turning to a separate model, production planner 110 may determine a production plan using a well-structured MIP model which comprises three sub-models: a network production sub-model, an option capacity sub-model, and a linking constraints sub-model.

The network production sub-model may comprise, for example, a suitable mixed integer linear program model consistent according to the following. For example, given the decision variables, $x_{lpmt}$, which is the volume of the automobile model ($l \in L$) (such a sedan, SUV, or other like automobile models) produced at manufacturing plant p ($p \in P$) to market m ($m \in M$) at period t ($t \in T$); and $w_{lpt}/z_{lpt}$, which are the under/over slack of production of automobile model l, for plant p at period t; and the parameter $C_{lpt}/d_{lpt}$, which is the under/over penalty of slack of production constraints of model l, for plant p at period t, the production network model may comprise the following objective (4) and constraints (5)-(9):

$$\min \sum_{m \in M} \sum_{l \in L} \sum_{t \in T} (c_{lpt} w_{lpt} + d_{lpt} z_{lpt}) \quad (4)$$

subject to:

$$\text{stock}_{ml(t-1)} + \sum_{p}^{P} x_{lpmt} - \text{stock}_{mlt} = \text{sales forecast} \ \forall \ m, l \in L, t \quad (5)$$

$$\sum_{m \in M} x_{lpmt} + w_{lpt} - z_{lpt} = \text{production capacity} \ \forall \ p \in P, \quad (6)$$

$$l \in L, t \in T$$

$$\text{minStock}_{mlt} \leq \text{stock}_{mlt} \leq \text{maxStock}_{mlt} \quad (7)$$

$$x_{lpmt}, w_{lpt}, z_{lpt} \geq 0 \quad (8)$$

$$x_{lpmt}, w_{lpt}, z_{lpt} \in \mathbb{N} \quad (9)$$

where L=vehicle model set

The objective (4) of the production network sub-model minimizes the penalty associated with the slack to satisfy the sales forecast and minimize the violation of the production capacity. The constraints include the sales forecast (5) must be equal to the initial stock at the beginning of a planning period, $\text{stock}_{ml(t-1)}$, plus the production of the automobile model during the production period, $\in_p^P x_{lpmt}$, minus the stock remaining at the end of the production period, $\text{stock}_{mlt}$. A further constraint (6) includes setting production capacity an automobile model equal to the production at a particular plant, $\Sigma_{m \in M} x_{lpmt}$, plus or minus any slack, $w_{lpt}$-$z_{lpt}$. Also, all stock, $\text{stock}_{mlt}$, is constrained (7) to be between the minimum stock, $\text{minStock}_{mlt}$, and maximum stock, $\text{maxStock}_{mlt}$. Also, all decision variables are non-negative (8) and natural numbers (i.e. zero and positive integers) (9).

Although the network production sub-model accounts for production, sales forecast, and stock constraints, it fails to address option capacity constraints. For example, continuing with the example of FIGS. 4-5, assume that an additional constraint of a sales forecast for a sedan with a spoiler is 90 automobiles in January and 100 automobiles in February. According to the exemplary network model 400 that was described, the network model 400 of FIGS. 4-5 fails to account for different configurations of a sedan. For example, the sedans may comprise the eight configurations of sedans WITH a spoiler and sedans WITHOUT according to TABLE 8. Instead of continuing with the network model 400 of FIG. 6, production planner 110 may employ an option capacity sub-model to model the configurations of the vehicle model.

According to embodiments, the network model 400 does not efficiently model automobile options because, owing to the large number of possible configurations, the network model 400 may be too large to calculate (the RAM requirements have exceeded 256 GB in some models) for even a moderate-sized automobile supply chain network 100. Therefore, even though production planner 110 may use the production network sub-model to determine how many sedans may be produced, it cannot determine automobile options, such as how many sedans with spoilers should be produced and how many sedans without spoilers should be produced.

Instead, production planner 110 models option capacity production and FDV using the option capacity sub-model. Markets are not targeted in capacity constraints so these may be merged in the option capacity sub-model. In other words, the production network sub-model considers only automobile models (such as, for example, sedans and SUVs), and the option capacity sub-model considers the FDV, such as, for example, particular sedan configurations, including the sedan with particular configurations of spoilers, engines, or sunroofs, as indicated in TABLE 8.

According to embodiments of the option capacity sub-model, production planner 110 models option capacity production and FDV with the decision variables, $y_{vpt}$, which is the volume of the vehicle (or class) v, (v∈V), produced at plant p (p∈P), at period t (t∈T); $u_{ODSt}$/$o_{ODSt}$, which are the under/over slack of capacity ODS at period t; and parameters, $a_{ODSt}$/$b_{ODSt}$, which are the penalties for the under/over slack of capacity ODS at period t. Some FDVs cannot be produced in certain manufacturing plants. If an automobile model v can be produced in manufacturing plant p, then, this may indicated in the option constraint model by v∈Vp. An automobile class may be any suitable configuration of an automobile or automobile component, such as "sedan with a spoiler," being one automobile class, and "sedan without a spoiler," being another automobile class. Although particular examples are given, automobile class may comprise any configuration of automobile or automotive components, according to particular needs.

According to embodiments, the option capacity sub-model comprises the following objective (10) and constraints (11)-(13):

$$\min \sum_{ODS \in ODSs} \sum_{t \in T} (a_{ODSt} u_{ODSt} + b_{ODSt} o_{ODSt}) \quad (10)$$

subject to:

$$\sum_{p \in P} \sum_{v \in ODS \wedge v \in VP} y_{vpt} + u_{ODSt} - o_{ODSt} = \quad (11)$$

$$\text{capacity}_{ODSt} \forall \ ODS \in ODSs, t \forall T$$

$$y_{vpt}, u_{ODSt}, o_{ODSt} \geq 0 \quad (12)$$

$$y_{vpt}, u_{ODSt}, o_{ODSt} \in \mathbb{N} \quad (13)$$

where ODS=option definition set

The objective (10) of the option capacity sub-model minimizes the violation of the capacity constraints for ODS by the penalties associated with the slack. The constraints include the option capacity constraint, $\text{capacity}_{ODSt}$, (11), and that all decision variables are non-negative (12) and natural numbers (13).

To generate a production plan, the production network sub-model and the option capacity sub-model may be joined by the linking constraints sub-model to generate a complete well-structured MIP model. According to embodiments, the linking constraint comprises:

$$\sum_{v \in l} y_{vpt} - \sum_{m \in M} x_{lpmt} = 0 \; \forall \; l \in L, p \in P, t \; \forall \; T \qquad (14)$$

The linking constraint sub-model comprises a constraint (14) that joins the production network sub-model to the option capacity sub-model by setting as equal to zero the difference between volume of an automotive model (such as, for example, the sedan) that is produced at plant p at market m, at time period t, $x_{lpmt}$, equal to the production of the automobile class (such as, for example, "sedans with spoilers," and "sedans without spoilers) at plant p, at period t, $y_{vpt}$. Because market m is not taken into account in the option capacity sub-model, the linking constraint sums the volume of the automobile or automotive component over all markets.

When the network production sub-model, the option capacity sub-model, and the linking constraints sub-model are joined, production planner may generate the following complete well-structured MIP model of minimizing the objective function (15) subject to constraints (16)-(22):

$$\min \sum_{ODS \in ODSs} \sum_{t \in T} (a_{ODSt} u_{ODSt} + b_{ODSt} o_{ODSt}) + \qquad (15)$$

$$\sum_{l \in L} \sum_{p \in P} \sum_{t \in T} (c_{lpt} w_{lpt} + d_{lpt} z_{lpt})$$

subject to:

$$\text{stock}_{ml(t-1)} + \sum_{p \in P} x_{lpmt} - \text{stock}_{mlt} = \text{sales forecast} \; \forall \; m, \qquad (16)$$

$l \in L, t$ $$\sum_{m \in M} x_{lpmt} + w_{lpt} - z_{lpt} = \text{production capacity} \; \forall \; p \in P, \qquad (17)$$

$l \in L, t \in T$ $$\text{minStock}_{mlt} \leq \text{stock}_{mlt} \leq \text{maxStock}_{mlt} \qquad (18)$$

$$\sum_{p \in P} \sum_{v \in ODS \land v \in V_p} y_{vpt} + u_{ODSt} - o_{ODSt} = \qquad (19)$$

$\text{capacity}_{ODSt} \; \forall \; ODS \in ODSs, t \; \forall \; T$

-continued $$\sum_{v \in l} y_{vpt} - \sum_{m \in M} x_{lpmt} = 0 \; \forall \; l \in L, p \in P, t \; \forall \; T \qquad (20)$$

$$x_{lpmt}, y_{vpt}, \text{stock}_{mlt}, u_{ODSt}, o_{ODSt}, w_{lpt}, z_{lpt} \geq 0 \qquad (21)$$

$$x_{lpmt}, y_{vpt}, \text{stock}_{mlt}, u_{ODSt}, o_{ODSt}, w_{lpt}, z_{lpt} \in \mathbb{N} \qquad (22)$$

The solution of the complete well-structured MIP model represents the production plan for the automotive supply chain network including the constraints for sales forecasts, production capacity, minimum and maximum stock, and the capacity for particular options, as explained above in connection with the production network sub-model and the option capacity sub-model.

Figure 8:
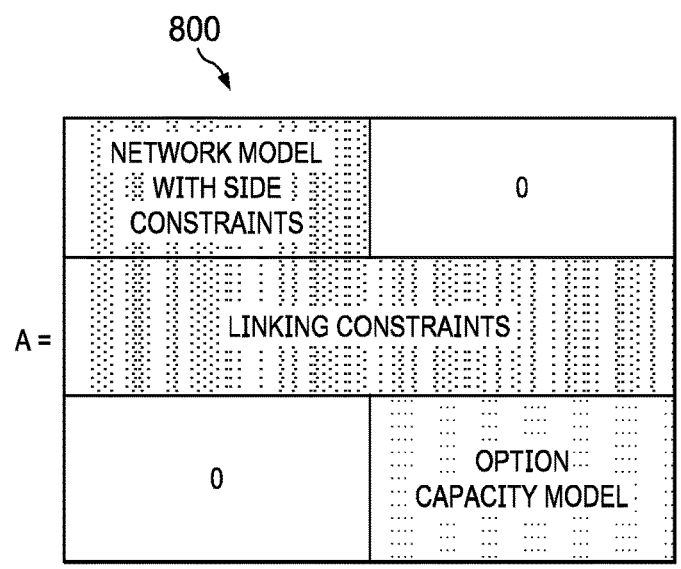
FIG. 8 illustrates a linear equation matrix of the complete well-structured MIP model of the automotive supply chain network, according to an embodiment.

FIG. 8 illustrates a linear equation matrix 800 of the complete well-structured MIP model of the automotive supply chain network, according to an embodiment. The matrix of the linear equation matrix (Ax=b) illustrates the production network sub-model with side constraints with the production and the min-max stock constraints, the linking constraints, and the option capacity sub-model.

Figure 9:
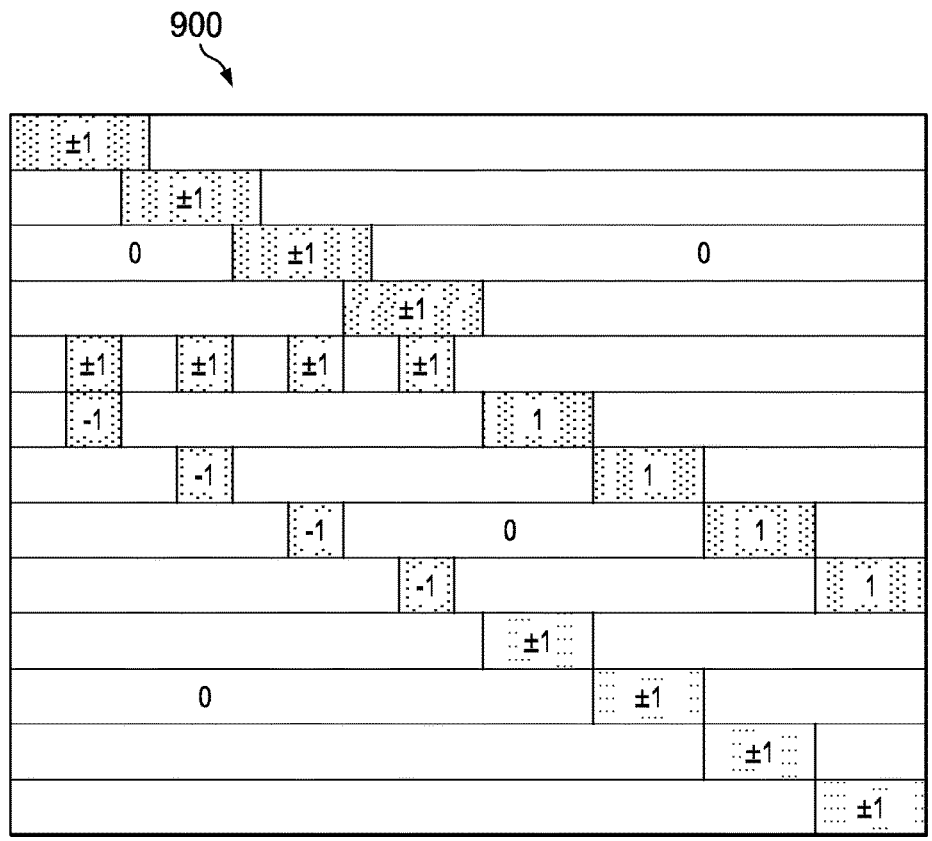
FIG. 9 illustrates the structure of the linear equation matrix of the complete well-structured MIP model of the automotive supply chain network, according to an embodiment.

FIG. 9 illustrates the structure 900 of the linear equation matrix 800 of the complete well-structured MIP model of the automotive supply chain network, according to an embodiment. As can be seen by the non-zero values in the structure 900, the complete well-structured MIP model is well-structured. Based on the stock, production constraints, linking constraints, and the production of the production network sub-model equal to the production of the option capacity sub-model, the complete well-structured MIP model comprises a well-structured model, as can be seen by the diagonal shape of the matrix, the minimal rows, the sparseness, and only having values of −1 and 1 in the matrix. Matrices with this structure may be solved quickly with even a commercial solver, such as, for example, a SIMPLEX solver. Additionally, the linear relaxation is close to the integer solution since it is a network model with side constraints, which may be solved easily, as well.

In fact, the model is able to efficiently solve in approximately twenty minutes, which is substantially less time than traditional methods, with a 0.01% gap, an automobile supply chain production problem comprising, approximately, 400,000 vehicles, 77 vehicle models, 22 plants, 48 time periods, 725 regions, 4,608 production constraints (model/plant/period), 309,000 sales forecasts (model/region/period), and 120,192 option capacity constraints (more than 10000 options).

To further illustrate the operation of production planner 110, consider the following regional sales forecast.

TABLE 9

| Model | REGION | September 2015 | October 2015 | November 2015 | December 2015 | January 2016 | February 2016 | March 2016 |
|---|---|---|---|---|---|---|---|---|
| SEDAN | USA | 7592 | 7400 | 7321 | 8681 | 4215 | 4881 | 6266 |
| SEDAN | CAN | 14522 | 12067 | 13792 | 11644 | 15688 | 15203 | 19307 |
| SEDAN | MEX | 12784 | 10372 | 9195 | 14316 | 8268 | 9966 | 14328 |
| PICKUP | USA | 483 | 837 | 889 | 1243 | 196 | 327 | 436 |
| PICKUP | CAN | 2516 | 3275 | 3629 | 2727 | 3346 | 3251 | 3949 |
| PICKUP | MEX | 1605 | 1041 | 869 | 1016 | 1260 | 749 | 1416 |
| ELEC | USA | 115 | 26 | 13 | 9 | 15 | 16 | 18 |
| ELEC | CAN | 955 | 1178 | 1197 | 1115 | 802 | 757 | 1130 |

TABLE 9-continued

| Model | REGION | September 2015 | October 2015 | November 2015 | December 2015 | January 2016 | February 2016 | March 2016 |
|---|---|---|---|---|---|---|---|---|
| ELEC | MEX | 852 | 895 | 960 | 1748 | 937 | 995 | 1200 |
| SUV | USA | 9052 | 6893 | 7036 | 7072 | 6560 | 5866 | 4312 |
| SUV | CAN | 11571 | 9009 | 9132 | 8543 | 10093 | 9741 | 13919 |
| SUV | MEX | 7926 | 5940 | 5584 | 5858 | 4683 | 5739 | 7577 |

TABLE 9 represents a regional sales forecasts associated with a particular model for a particular region, for particular time periods. For example, a SEDAN model in the American region is needed in the amounts of 7,592 for September 2015 and 7,400 in October 2015. This input comprises a first constraint on the model.

TABLE 10

| Plant | Model | AUGUST 2015/W35 | 2015/W36 | SEPTEMBER 2015/W37 | 2015/W38 | 2015/W39 | 2015/W40 |
|---|---|---|---|---|---|---|---|
| B | SEDAN | 27 | 120 | 150 | 150 | 150 | 90 |
| C | ELEC | 61 | 374 | 445 | 446 | 483 | 270 |
| C | SEDAN | 390 | 2264 | 2676 | 2682 | 2908 | 1620 |
| D | SUV | 1152 | 4597 | 4990 | 6115 | 5655 | 3375 |
| A | SEDAN | 768 | 4170 | 4992 | 4992 | 1664 | 2796 |
| A | PICKUP | 213 | 1156 | 1392 | 1392 | 464 | 696 |

TABLE 10 illustrates plant production capacities for particular models associated with particular time periods. Here, the SEDAN model may only be produced by the plant B in the amount of 120 in the 36th week of 2015. This input comprises a further constraint on the model.

TABLE 11

| Model | REGION | September 2015 | October 2015 | November 2015 | December 2015 | January 2016 |
|---|---|---|---|---|---|---|
| SEDAN | USA | 9307 | 9606 | 9422 | 5954 | 6658 |
| SEDAN | CAN | 22535 | 24331 | 25510 | 27182 | 27546 |
| SEDAN | MEX | 12941 | 14720 | 15865 | 11396 | 13581 |
| PICKUP | USA | 614 | 705 | 938 | 290 | 358 |
| PICKUP | CAN | 6690 | 6784 | 6423 | 6591 | 6630 |
| PICKUP | MEX | 1558 | 1507 | 1725 | 1675 | 1441 |

TABLE 11-continued

| Model | REGION | September 2015 | October 2015 | November 2015 | December 2015 | January 2016 |
|---|---|---|---|---|---|---|
| ELEC | USA | 3 | 4 | 4 | 5 | 7 |
| ELEC | CAN | 1658 | 1766 | 1564 | 1215 | 1239 |
| ELEC | MEX | 1215 | 1496 | 1914 | 1253 | 1302 |
| SUV | USA | 18053 | 17938 | 15289 | 12010 | 9922 |
| SUV | CAN | 13811 | 14030 | 14405 | 14661 | 15694 |
| SUV | MEX | 5522 | 5507 | 5653 | 4590 | 5359 |

TABLE 11 illustrates a minimum stock associated with each model for a particular region at particular time periods. For example, the SEDAN model is limited to a minimum of 9,307 automobiles in the American region for September of 2015, and 9,606 in October of 2015. This comprises a further constraint on the model.

TABLE 12

| Model | REGION | September 2015 | October 2015 | November 2015 | December 2015 | January 2016 | February 2016 |
|---|---|---|---|---|---|---|---|
| SEDAN | USA | 11634 | 12008 | 11777 | 7443 | 8322 | 8978 |
| SEDAN | CAN | 28169 | 30414 | 31887 | 33978 | 34433 | 34869 |
| SEDAN | MEX | 16176 | 18400 | 19831 | 14245 | 16976 | 18604 |
| PICKUP | USA | 767 | 881 | 1172 | 362 | 448 | 481 |
| PICKUP | CAN | 8362 | 8480 | 8029 | 8239 | 8287 | 8540 |
| PICKUP | MEX | 1948 | 1884 | 2156 | 2094 | 1801 | 2227 |
| ELEC | USA | 4 | 5 | 5 | 6 | 9 | 8 |
| ELEC | CAN | 2073 | 2207 | 1955 | 1519 | 1549 | 1778 |
| ELEC | MEX | 1519 | 1870 | 2392 | 1566 | 1627 | 1636 |
| SUV | USA | 22566 | 22422 | 19111 | 15012 | 12403 | 10617 |
| SUV | CAN | 17264 | 17537 | 18006 | 18326 | 19617 | 20881 |
| SUV | MEX | 6902 | 6884 | 7066 | 5737 | 6699 | 7263 |

TABLE 12 illustrates a maximum stock associated with each model for a particular region at particular time periods. For example, the SEDAN model is limited to a maximum of 11,634 automobiles in the American region for September of 2015, and 12,008 in October of 2015. This comprises a further constraint on the model.

TABLE 13

| Model  | REGION | Total |
|--------|--------|-------|
| SEDAN  | USA    | 10176 |
| SEDAN  | CAN    | 20463 |
| SEDAN  | MEX    | 9726  |
| PICKUP | USA    | 444   |
| PICKUP | CAN    | 5731  |
| PICKUP | MEX    | 1561  |
| ELEC   | USA    | 95    |
| ELEC   | CAN    | 1061  |
| ELEC   | MEX    | 690   |
| SUV    | USA    | 16267 |
| SUV    | CAN    | 15945 |
| SUV    | MEX    | 8080  |

TABLE 13 illustrates an initial stock associated with each model for a particular region at the beginning of the production planning period. The amount of automobiles indicated in the total column represents the amount of initial stock on-hand at the particular region at the beginning of the production planning period. For example, the amount of SEDAN models in the American region at the beginning of the planning period is 10,176 automobiles.

TABLE 14

| ODS | 2015/W36 | 2015/W37 | 2015/W38 | 2015/W39 | 2015/W40 | 2015/W41 |
|-----|----------|----------|----------|----------|----------|----------|
| Black SUV with V8 | 1327 | 1164 | 1406 | 1300 | 1406 | 1300 |
| Any model with V6 | 4617 | 4049 | 4892 | 4524 | 4892 | 4524 |
| Sedan with a sunroof but without spoiler | 1616 | 911 | 1100 | 1017 | 1100 | 1017 |
| SUV with a radio A | 1750 | 1306 | 1630 | 1750 | 1058 | 1600 |
| All sedans and pickups | 652 | 1000 | 1000 | 175 | 1025 | 650 |
| SUV with a 4 cylinders | 3800 | 3361 | 3240 | 3122 | 3323 | 3362 |

TABLE 14 illustrates constraints for ODS associated with particular time periods. As explained in detail above, these constraints may comprise production capacity constraints or other limits on the total number of comprising FDV that match the ODS listed in the above chart. For example, the total number of Black SUVs with V8 is 1,327 in the 36th week of 2015 and 1,164 in the 37th week of 2015. After all constraints are input into the model, as explained in greater detail above, production planner 110 may determine a production plan comprising the number of automobiles to produce at particular plants shipped to particular regions during particular time periods.

The following table illustrates a simplified production plan for an SUV model.

TABLE 15

| Plant | Market | Period | Volume |
|-------|--------|--------|--------|
| A | USA | 1 | 15 |
| A | USA | 2 | 20 |
| B | USA | 1 | 0 |
| C | CAN | 1 | 76 |
| C | CAN | 2 | 112 |
| C | MEX | 3 | 34 |

TABLE 15 illustrates an exemplary production plan for an automobile configuration according to an embodiment. A production plan for the automobile configuration FDV1 is illustrated. The FDV1 may represent for example, a SUV model, a V8-4.2 engine, a RADA radio, no all-wheel drive (AWD), and a black color. The production plan generated by production planner 110 may indicate that the FDV1 model should be built in particular volumes, at particular plants, in particular markets, for particular periods based on overall sales volume forecast while respecting plant and supplier capacity. For example, the production plan illustrated in the above figure indicates that Plant A should product a volume of 15 automobiles for the USA market in a first period, and 20 automobiles in a second period. Plant B should product no automobiles, and Plant C should produce 76 automobiles for the Canadian market in the first time period, and 112 automobiles for the Canadian market in the second time period. Plant C should also produce 34 automobiles in a third period for the Mexican market. Although particular plants, markets, periods, and volumes are illustrated, embodiments contemplate any suitable number or types of plants, markets, periods, or volumes according to particular needs.

The production plan based on the FDV1 automobile configuration is simpler than previous attempts at generating a production plan. According to embodiments, the solution does not target all the options in an automobile configuration. Many of the options will have been aggregated together through declination of FDVs, as described above.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:
1. A method, comprising:
receiving a sales forecast for two or more configurations of an automobile;
receiving one or more constraints associated with an automobile supply chain;
modeling the two or more configurations and the one or more constraints as a mixed integer linear programming problem;
determining a production plan for the automobile; and
comparing the difference between a current inventory level of an automobile and a forecasted production level for the automobile in the production plan and sending, by production planner to automated machinery, instructions to cause the automated machinery to retrieve an amount of the automobile equal to the forecasted production level minus the current inventory level and to move the amount of the automobile to an inventory location of the automobile.

2. The method of claim 1, further comprising:
representing the one or more automobile configurations by an alphanumeric string; and
aggregating variables of the automobile configurations by one or more option definition sets.

3. The method of claim 2, wherein the one or more constraints comprise one or more of:
flow constraints;
production capacity constraints;
minimum stock; and
maximum stock.

4. The method of claim 3, wherein the option definition sets comprise constraints associated with logical operators.

5. The method of claim 4, wherein the mixed integer linear programming problem comprises a well-structured mixed integer linear programming problem comprising a network production sub-model, an option capacity sub-model; and
the network production sub-model is linked to the option capacity sub-model by a linking constraint sub-model.

6. The method of claim 4, wherein the mixed integer linear programming problem comprises a mixed integer linear programming problem model with variable aggregation.

7. A system, comprising:
a production planner comprising a processor and a memory, the production planner configured to:
receive a sales forecast for two or more configurations of an automobile;
receive one or more constraints associated with an automobile supply chain;
model the two or more configurations and the one or more constraints as a mixed integer linear programming problem;
determine a production plan for the automobile; and
compare the difference between a current inventory level of an automobile and a forecasted production level for the automobile in the production plan and send to automated machinery, instructions to cause the automated machinery to retrieve an amount of the automobile equal to the forecasted production level minus the current inventory level and to move the amount of the automobile to an inventory location of the automobile.

8. The system of claim 7, wherein the production planner is further configured to:
represent the one or more automobile configurations by an alphanumeric string; and aggregate variables of the automobile configurations by one or more option definition sets.

9. The system of claim 8, wherein the one or more constraints comprise one or more of:
flow constraints;
production capacity constraints;
minimum stock; and
maximum stock.

10. The system of claim 9, wherein the option definition sets comprise constraints associated with logical operators.

11. The system of claim 10, wherein the mixed integer linear programming problem comprises a well-structured mixed integer linear programming problem comprising a network production sub-model, an option capacity sub-model; and
the network production sub-model is linked to the option capacity sub-model by a linking constraint sub-model.

12. The system of claim 10, wherein the mixed integer linear programming problem comprises a mixed integer linear programming problem model with variable aggregation.

13. The system of claim 11, wherein the linking constraint sub-model comprises a constraint that joins the production network sub-model to the option capacity sub-model by setting as equal to zero the difference between volume of an automobile model that is produced at a particular plant for a particular market at a particular time period equal to the production of an automobile class at the particular plant at the particular time period, summed over all markets.

14. A non-transitory computer-readable medium comprising software, the software when executed configured to:
receive a sales forecast for two or more configurations of an automobile;
receive one or more constraints associated with an automobile supply chain;
model the two or more configurations and the one or more constraints as a mixed integer linear programming problem;
determine a production plan for the automobile; and
compare the difference between a current inventory level of an automobile and a forecasted production level for the automobile in the production plan and send to automated machinery, instructions to cause the automated machinery to retrieve an amount of the automobile equal to the forecasted production level minus the current inventory level and to move the amount of the automobile to an inventory location of the automobile.

15. The non-transitory computer-readable medium of claim 14, wherein the software is further configured to:
represent the one or more automobile configurations by an alphanumeric string; and
aggregate variables of the automobile configurations by one or more option definition sets.

16. The non-transitory computer-readable medium of claim 15, wherein the one or more constraints comprise one or more of:
flow constraints;
production capacity constraints;
minimum stock; and
maximum stock.

17. The non-transitory computer-readable medium of claim 16, wherein the option definition sets comprise constraints associated with logical operators.

18. The non-transitory computer-readable medium of claim 17, wherein the mixed integer linear programming problem comprises a well-structured mixed integer linear programming problem comprising a network production sub-model, an option capacity sub-model; and
the network production sub-model is linked to the option capacity sub-model by a linking constraint sub-model.

19. The non-transitory computer-readable medium of claim 17, wherein the mixed integer linear programming problem comprises a mixed integer linear programming problem model with variable aggregation.

20. The non-transitory computer-readable medium of claim 18, wherein the linking constraint sub-model comprises a constraint that joins the production network sub-model to the option capacity sub-model by setting as equal to zero the difference between volume of an automobile model that is produced at a particular plant for a particular market at a particular time period equal to the production of an automobile class at the particular plant at the particular time period, summed over all markets.

* * * * *